United States Patent [19]
Heileman, Jr. et al.

[11] Patent Number: 5,133,004
[45] Date of Patent: Jul. 21, 1992

[54] DIGITAL COMPUTER PLATFORM FOR SUPPORTING TELEPHONE NETWORK APPLICATIONS

[75] Inventors: David W. Heileman, Jr., West Chester; Tommy L. Bennett, Douglassville; Frederick C. Kruesi, Exton; Robert A. Latimer, Plymouth Meeting, all of Pa.

[73] Assignee: Unisys Corporation, Blue Bell, Pa.

[21] Appl. No.: 521,210

[22] Filed: May 7, 1990

[51] Int. Cl.$^5$ .............................................. H04M 1/64
[52] U.S. Cl. ........................................ 379/67; 379/88; 379/97
[58] Field of Search ..................... 379/67, 88, 89, 97

[56] References Cited

U.S. PATENT DOCUMENTS

| | | | |
|---|---|---|---|
| 4,757,267 | 7/1988 | Riskin | 379/97 |
| 4,785,408 | 11/1988 | Britton et al. | 379/97 |
| 4,792,968 | 12/1988 | Katz | 379/97 |
| 4,979,206 | 12/1990 | Padden et al. | 379/88 |
| 4,993,062 | 2/1991 | Dula et al. | 379/88 |

OTHER PUBLICATIONS

"IBM View of Intelligent Network Architecture Evolution", H. Forner, First International conference on Intelligent networks, Mar. 14, 1989.

"Que's Computer User's Dictionary", Bryan Pfaffenberger, pp. 169-172, Property of Unisys Information Center Blue Bell, Pa.

"The Telecononnect Dictionary: An Explanation of Telecommunications Terms, Acronyms and Jargon", Ralph Florido, Telecom Library, Inc., p. 20, 126.

"Unisys Synthesis: A Gateway for Audiotex", R. W. Lawson, Telephony, vol. 216, No. 3, Jan. 16, 1986, pp. 34-41.

"Voice Storage Services", Tetsuya Isoyama et al., Japan Telecommunication Review, vol. 28, No. 4, Oct. 1986, pp. 271-280.

"The Intelligent Network and Forward-Looking Technology", F. J. Weisser et al., IEEE Communication Magazine, vol. 26, No. 12, Dec. 1988 pp. 64-69.

"Application of a New Network Concept for Faster Service Deployment", J. Shah et al., IEEE International conference on communications, vol. 313, Jun. 12, 1988 pp. 1327-1331.

*Primary Examiner*—Jin F. Ng
*Assistant Examiner*—Huyen D. Le
*Attorney, Agent, or Firm*—Albert B. Cooper; Mark T. Starr

[57] ABSTRACT

A platform for supporting telephone netrwork applications includes Network Interface Units (NIU) for interfacing between the telephone network and the platform. A disk storage system stores voice messages to be sent over the network and voice messages received from the network. Voice messages are conveyed between the NIUs and the disk storage system by Voice Interface Modules (VIM). The platform is installed on a general purpose digital computer and includes an Application Interface Module (AIM) responsive to an AIM command set including: SEND VOICE MESSAGE, CONNECT CALL, COLLECT DIGITS, INITIATE CALL, TERMINATE CALL, GET MESSAGE NUMBERS and PIVOT CALL. In response to SEND VOICE MESSAGE, a designed message stored on the disk system is sent to the network via the VIM. SEND VOICE MESSAGE has a RECEIVE VOICE MESSAGE option whereby a message is received from the network after the SEND data is transmitted and stored on disk. The platform initiates a call to the network in response to INITIATE CALL and an application is informed of an incoming call to the network by an INCOMING CALL Response from the AIM to the application. DTMF digits entered during a call are returned to the application in response to COLLECT DIGITS or an AIM command which processes digits. The digits are processed in accordance with Digit Rules. The ports of the NYUs are connected and disconnected in response to CONNECT CALL, TERMINATE CALL and PIVOT CALL.

19 Claims, 7 Drawing Sheets

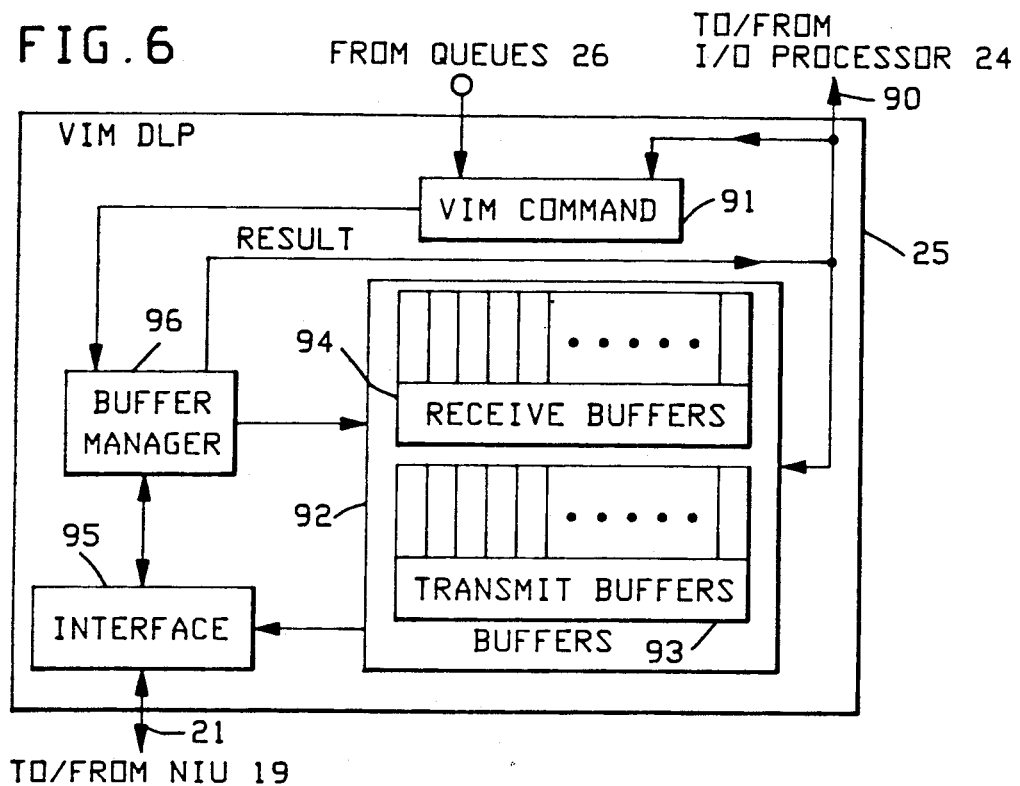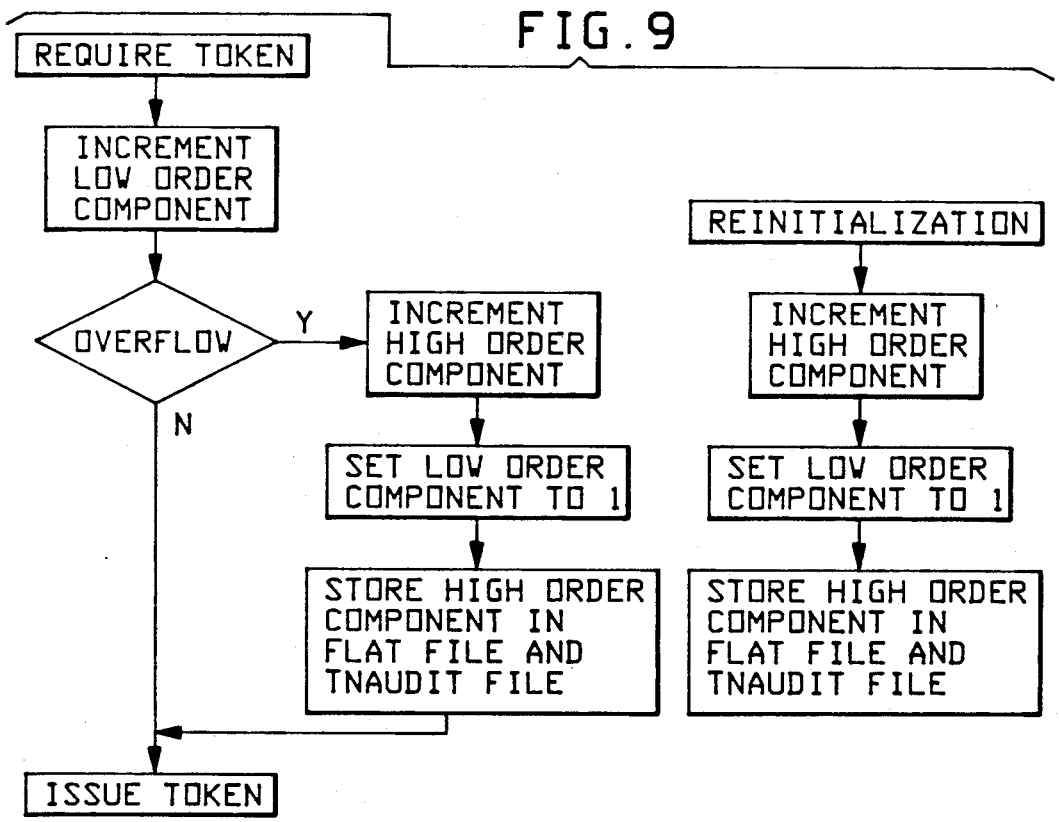

FIG. 7A

AIM COMMAND AND RESPONSE COMMON HEADER  40

| MESSAGE TYPE | DIALOG ID | DIGIT RULE | DIGIT COUNT | DELIMITER LIST | PURGE DIGITS | TIME LIMIT | DIGIT OVERRUN |
|---|---|---|---|---|---|---|---|
| 41 | 42 | 43 | 44 | 45 | 46 | 47 | 48 |

FIG. 7B

AIM RESPONSE COMMON HEADER  50

| ON HOOK | TIME OUT | DIGITS RECEIVED | DIGIT DELIMITER | DIGITS |
|---|---|---|---|---|
| 51 | 52 | 53 | 54 | 55 |

FIG. 7C

AIM COMMAND  60

| HEADER 40 | BODY | STATE |
|---|---|---|
|  | 61 | 62 |

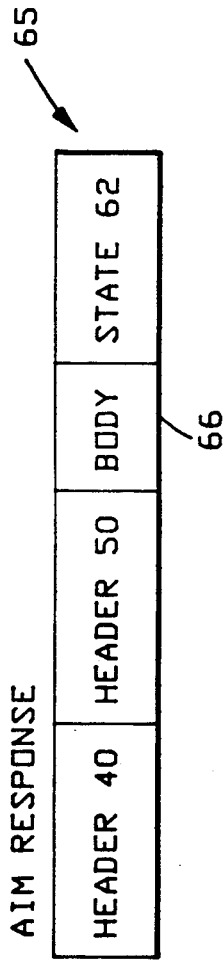

VMMM VOICE MESSAGE SEGMENT (VMS) FORMAT

INDEX STRUCTURE POINTER FORMAT

DIGITAL COMPUTER PLATFORM FOR SUPPORTING TELEPHONE NETWORK APPLICATIONS

BACKGROUND OF THE INVENTION

1. Field of the Invention

The invention relates to providing telephone services via application software for such services and involves a telephone network digital computer platform for supporting such application software.

2. Description of the Prior Art

A variety of telephone services and enhanced services are currently available such as Call Answer, Call Forward, Voice Store and Forward, Voice Mail, Emergency Number Facilities, Directory Assistance, Operator Assistance, Call Screening, Automatic Wake-up Services, and the like. Generally, such services are provided by dedicated systems specifically designed for the service and for the hardware environment in which the system will be deployed, such single purpose systems providing only the one enhanced service. Such systems tend to lack flexibility in that desired changes in functionality often require extensive, and hence expensive, modifications to the application software. Additionally, application software for providing such services are not portable in that a change in hardware environment usually requires substantial application software rewriting. Although such systems are usually computer based, such systems can only perform the functions for which they were designed and, thus, cannot also be utilized to perform general purpose data processing. Also such systems generally do not have access to data bases stored on general purpose computers. Additionally, if it is desired to provide a wide variety of services, utilization of a large number of dedicated systems tends to be prohibitively expensive.

Systems of the type described above for providing enhanced and new special services are generally used in premises, campus, PBX and PABX environments. Since the divestiture, however, the Bell Operating Companies (BOCs) and Independent Telephone Companies (Telcos) have been seeking ways to increase the return on their primary asset; viz, the installed network. One source of increased revenue would be to offer new services that integrate into, or interface with the existing network, resulting in greater utilization thereof. Prior to the present invention, it has been difficult for BOCs and Telcos to provide new services because network switches are designed to switch calls, not support data base or special service related functionality. Each Central Office (CO) utilizes a predetermined set of functions provided by the switch manufacturer. Only the manufacturer could add new services to the switching system which usually involved substantial lead times, such as two years or more. Additionally, the switch manufacturers have been particularly slow in responding to the needs of the BOCs and Telcos for enhanced service provisioning. Thus, a major limiting factor to providing such new services is a dependence on the telephone switch provider for implementing the capabilities required by these new services.

SUMMARY OF THE INVENTION

The present invention overcomes the above described disadvantages of the prior art by providing, for the first time, a Telephone Network Applications Platform that interfaces with the telephone network and supports application software deployed and/or developed by the BOCs and Telcos, which software provides services that the BOCs and Telcos desire to offer. A Telephone Network Applications Platform is a digital computer that interfaces with the network and is programmed with software that provides the telephone network functionality required to support the applications. Such functionality includes detecting and reporting an incoming call from the network, initiating an outgoing call to the network, receiving a voice message from the network, sending a voice message to the network, collecting digits entered from the network, switching calls between channels, terminating calls, and detecting and reporting call termination. The Network Applications Platform (NAP) includes a data base including a voice file for storing predetermined digitized voice and tone messages to be applied to the network and voice messages received from the network to be re-applied thereto.

In the preferred embodiment thereof, the NAP includes an Application Interface Module (AIM) for interfacing between the applications and the NAP. The AIM receives commands from the applications and returns appropriate responses thereto. One or more Network Interface Units (NIU) are also included for interfacing the lines and trunks of the network with the NAP. Each NIU is a digital switch controlled by the NAP. The NAP further includes a Network Interface Unit Module (NIUM) that interfaces between the AIM and the NIUs for controlling the NIUs in accordance with commands from the AIM and Voice Interface Modules (VIM) coupled to the NIUs by digital communication links. Voice messages to and from the NAP are processed through the VIMs. The NAP further includes a Voice Message Management Module (VMMM) that receives commands from the AIM to send stored voice messages from the voice file to the VIM and to store voice messages from the into the voice file.

BRIEF DESCRIPTION OF THE DRAWINGS

FIG. 6 is a schematic block diagram illustrating details of the Voice Interface Module (VIM) of the NAP of FIG. 1.

FIGS. 7a-7f, respectively, illustrate the AIM Command and Response common header format, AIM Response common header format, AIM Command format, AIM Response format, VIM Command format and NIUM Call Record format utilized within the NAP of FIG. 1.

FIG. 9 is a program flow diagram illustrating the Token Assignment procedure for Voice Messages.

DESCRIPTION OF THE PREFERRED EMBODIMENT

Figure 1:
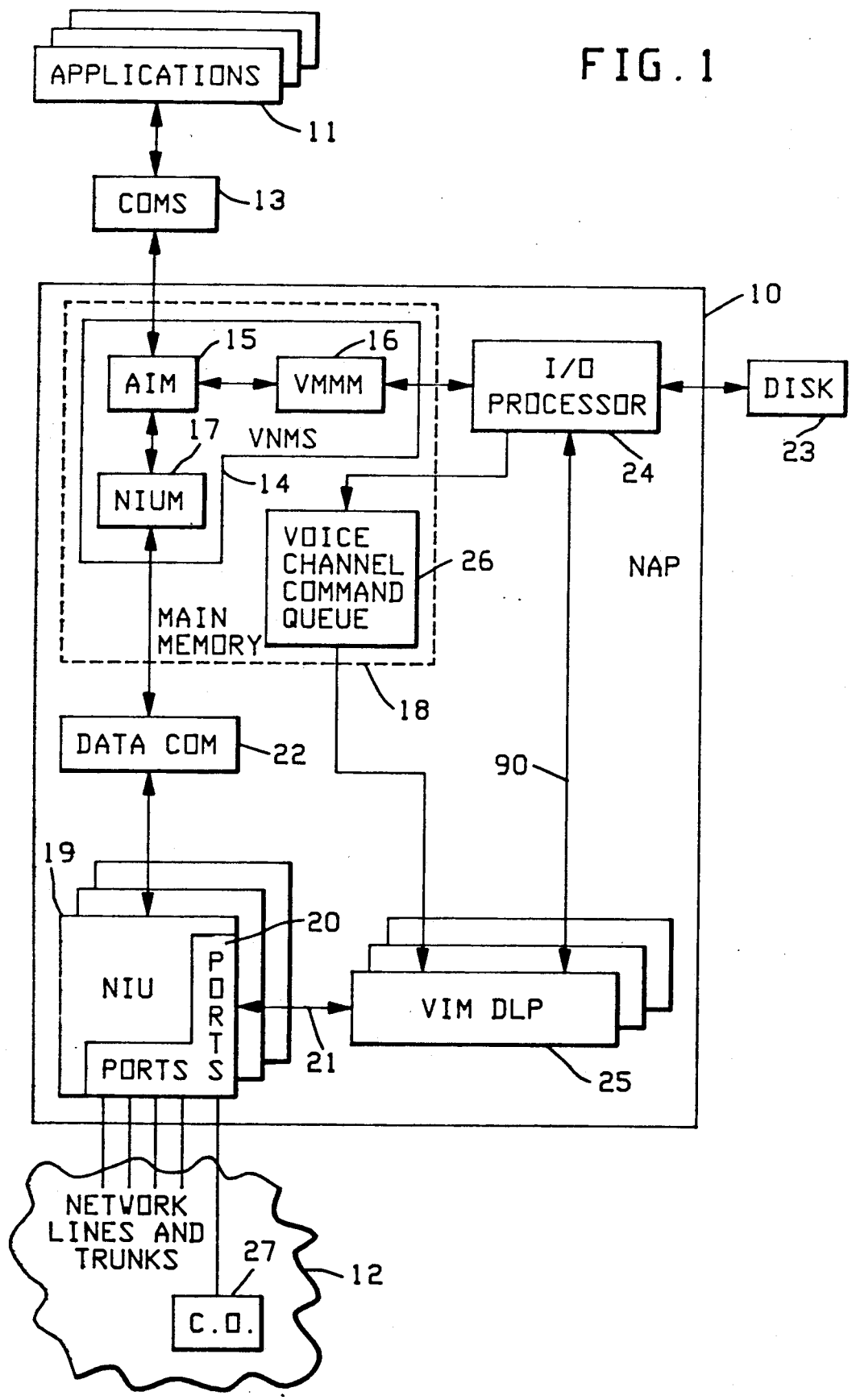
FIG. 1 is a schematic block diagram illustrating the overall architecture of the NAP of the present invention and the environment in which the NAP is deployed.

Referring to FIG. 1, a NAP 10 is illustrated interfacing between telephone network application programs 11 and a telephone network 12. In the preferred embodiment of the invention, the NAP 10 is implemented on an A Series digital computer system commercially available from Unisys Corporation of Blue Bell, Pennsylvania. The NAP 10 advantageously utilizes the standard parallel I/O processing capabilities, the data base management Data Management System II (DMSII) and disk storage facilities and Direct I/O, as well as the communications capabilities such as Communication Management System (COMS) and Data Communications (DATACOM) of the A Series system. The applications 11 communicate with the NAP 10 through message-passing communication apparatus 13, such as the A Series COMS. The applications 11 may comprise a plurality of independent applications deployed by the telephone company (and perhaps developed thereby) to provide the desired services to the users.

The NAP 10 is comprised of three software modules collectively referred to as a Voice Network Management System (VNMS) 14. The VNMS 14 comprises an Application Interface Module (AIM) 15, a Voice Message Management Module (VMMM) 16, and a Network Interface Unit Manager 17. The VNMS 14 resides in main memory 18 of the computer system on which the NAP 10 is installed, for example the A Series system. The applications 11 communicate with the AIM 15 through the COMS 13 via multiple dialogs, each dialog representing a logically distinct sequence of related messages. The messages within each dialog occur in pairs, each pair comprising an AIM Command from an application 11 requesting the NAP 10 to perform a function and a response back from the AIM 15 to the application 11 with appropriate status information or data such as keyed-in caller digits or message number identification Tokens.

The AIM 15 is the point of communication between the NAP 10 and the applications 11 and directs the functionality of the NAP 10. Under the direction of the AIM 15, the VMMM 16 controls sending and receiving digital voice messages between the NAP 10 and the network 12. The AIM 15 also communicates with the NIUM 17 to receive digits from the network, such as DTMF digits; to receive status signals from the network, such as on-hook, off-hook, busy, no answer and answer supervision signals; and to control call switching at the interface between the NAP 10 and the network 12.

The NAP 10 interfaces with the network 12 through one or more Network Interface Units (NIUs) 19. Each NIU 19 comprises a computer-controlled, digital matrix switch that communicates with the lines and trunks of the network 12 via ports 20. The NIUs 19 communicate with the voice message portion of the NAP 10 via the ports 20 over a communication link 21. Preferably, the communication link 21 comprises a conventional T1 digital voice link or trunk. Multiple NIUs, possibly of different types, may exist within a single NAP installation. For example, one or more of the NIUs 19 may be implemented by the commercially available Summa Four SDS-1000.

The NIUs 19 communicate with the NIUM 17 via communication apparatus 22, such as the A Series DATACOM. The communication links through the DATACOM 22 from the NIUM 17 to the NIUs 19 control switching of the ports 20 so that any port can be connected to any other port and communicating status signals such as on-hook, off-hook, busy, no answer and answer supervision from the calls connected on the network 12 to the NIUM 17. Additionally, in a manner to be described, the NIUs 19 include DTMF receivers which may be selectively connected to the ports of incoming calls under control of the NIUM 17 to provide entered DTMF digits to the NIUM 17.

The VMMM 16 controls sending and receiving digital voice messages to and from the network 12. The messages are stored on a disk system 23 which preferably comprises a standard A Series disk storage and retrieval system. The VMMM 16 communicates with the disk system 23 through an I/0 processor system 24 which preferably includes an A Series I/0 interface such as DMSII and Direct I/0. The I/0 processor system 24 communicates with the T1 digital voice link 21 via an interface comprised of one or more Voice Interface Modules (VIM) 25. The VMMM 16 communicates with the VIMs 25 via the I/O processor system 24 which preferably includes the standard A Series MLI (SDS 2323 7399) communication subsystem for effecting the data transfers. Each of the VIMs 25 is associated with a plurality of voice channels currently established by the system. Send Voice Data and Receive Voice Data commands from the VMMM 16 to the VIMs 25 are schematically illustrated as held in voice channel command queues 26 in main memory 18. Each established voice channel has a command queue 26 for controlling operations thereof.

Predetermined voice messages, such as service offering prompts and instructions to the callers, are stored on the disk system 23. These messages are accessed by the applications 11 via the VMMM 16 and transmitted over a voice channel through selected ports in the NIU 19 under control of the VIM 25. Voice messages from callers are stored on the disk system 23 for re-transmission to the network 12 under control of appropriate applications 11. The NIUM 17 selects and connects the ports of the NIU 19 under command of the applications 11 and the VMMM 16 controls the flow of the digital voice messages via the I/0 processor 24 and the VIMs 25. It is appreciated that the NIUs 19 conventionally may include the requisite converters to interface the analog lines of the network 12 with the digital T1 trunk 21 although analog conversion need not occur in the NIU.

A Central Office (CO) switching plant 27 is illustrated in the network 12. Present day CO switches include the capability of detecting a predetermined number of ring-back or busy tones with respect to an incoming call and switching the incoming line to an outgoing line predetermined by the telephone company. Thus, for applications such as Call Answer, the CO 27 can switch the call to a telephone number in the address space of the CO 27, for routing the call to the NAP 10 so that the appropriate application can provide the service. Other services such as Voice Mail and Voice Store and Forward can use appropriate access telephone numbers in the address space of the CO so as to connect to the desired service. Based on configurable translation of information such as the incoming port address and telephone number or other information transmitted to the NAP 10 by the CO 27, the NIUM 17 determines the appropriate application to utilize.

During the processing of a call the NIUM 17 provides port selection commands to the NIU 19 and receives status signals pertaining to call processing, such as on-hook, off-hook, busy, ring no-answer and answer supervision. In a manner to be described, the NIUM 17 reports call status to the application 11 via the AIM 15. The NAP 10 makes extensive use of A Series system hardware and software. For example, the I/0 processor system 24 includes the A Series DMSII for the NAP data base requirements. In addition, the NAP 10 communicates with the network applications 11 utilizing the A Series COMS 13 which provides a message passing communication mechanism between independent programs in an A Series system.

Figure 2:
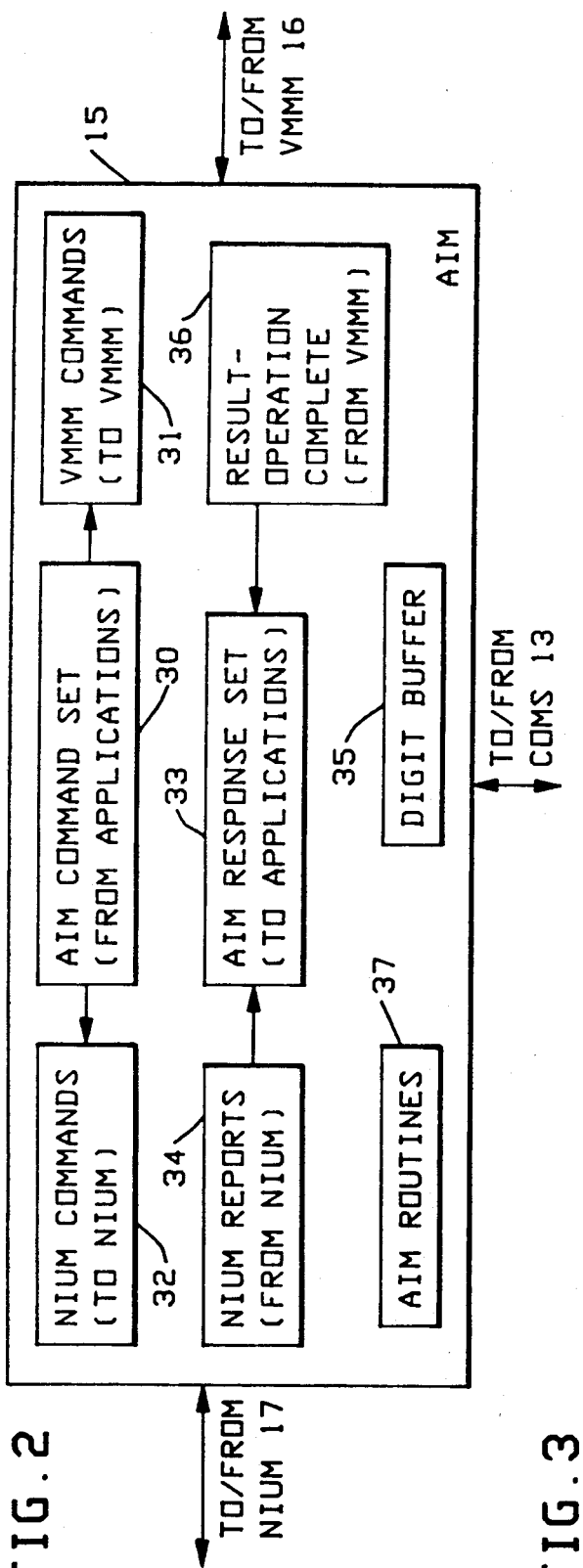
FIG. 2 is a schematic block diagram illustrating details of the Applications Interface Module (AIM) of the NAP of FIG. 1.

Referring to FIG. 2, where like reference numerals indicate like components with respect to FIG. and with continued reference to FIG. 1, further details of the AIM 15 are illustrated. Conceptually the AIM 15 includes an AIM Command Set 30 comprising a set of commands that are received from the applications for controlling the NAP 10 to perform functions desired by the application sending the command. As schematically represented, the AIM Command Set 30 is comprised of VMMM commands 31 for controlling the VMMM 16 to perform functions involving voice messages and NIUM commands 32 for signaling the NIUM 17 to perform control functions with respect to the NIU 19 such as call switching, digit handling and call status reporting.

The AIM 15 also conceptually includes an AIM Response Set 33 that provides an appropriate response from the AIM 15 back to the application 11 in response to an AIM command. An AIM response in the set 33 may, for example, return digits and status signals to the application 11. The AIM Response Set 33 is responsive to NIUM reports 34 from the NIUM 17 for providing such call related information as the digits and status signals received by the NIU 19. The AIM 15 includes a digit buffer 35 for buffering DTMF digits received during a call. The AIM Response Set 33 is also responsive to a result signal from the VMMM 16 indicating that an operation requested by a command has been completed. This result signal is indicated by reference numeral 36. Detailed operation of the AIM 15 will be described below.

It is appreciated from the foregoing, that the basic unit of information that is sent between an application 11 and the AIM 15 is a command or response message. A command is generated by the application 11 and sent to the AIM 15 and a response is provided by the AIM 15 and received by the application 11. Successive logically-related commands and the returned responses comprise a dialog. A dialog, which is represented by a dialog ID, is a concurrent logical communication path between the AIM 15 and an application 11. Generally, a dialog will be related to a call which is in process. The NAP 10, however, allows the initiation of a dialog which is not associated with a call, and therefore has no voice channel or port assigned. When a dialog is no longer required by an application 11, it is terminated. For example, an application 11 may terminate the dialog associated with a call soon after the caller has gone on-hook.

Generally, an application 11 and the NAP 10 operate one to one with respect to commands and responses within each dialog. The NAP 10 operates such that only one response is outstanding for each concurrent dialog at any point in time. Once the NAP 10 has released a response for a dialog, no other responses for the dialog are released until the application 11 generates a command and the NAP 10 has received it. An application 11 can generate one and only one command for a dialog after it has received and processed a response for that dialog. Once an application has received a response for a dialog, the application must not attempt to receive another response for that dialog until the application generates a command for that dialog. All dialogs begin with an unsolicited response from the NAP 10 to the application 11 and end with an unacknowledged command from the application 11 to the NAP 10. A new dialog is created by the NAP 10 in response to a detected incoming call or upon request by the application 11. All addressing information within messages passed between applications 11 and NAP 10 are preferably subject to configurable translation.

It is appreciated that the characteristics of the AIM 15, particularly with respect to the AIM Command and Response Sets 30,33, provide network application developers with a high-level, message-based, transaction-oriented environment for network control and voice message management thereby greatly facilitating application development. Network applications developed under the constraints of the AIM Command and Response Sets do not have any dependence on network configuration, signaling protocols, or characteristics of particular switching equipment. Thus, the NAP 10 promotes portability, flexibility, and extensibility in network applications, while at the same time greatly simplifying the development process. The programming environment and interface of the NAP 10 are designed to encourage the BOCs and Telcos to develop and deploy their own application software.

Digits that are received for a dialog will be placed in the digit buffer 35. The received digits are reported by the NAP to applications in accordance with Digit Rules specifying how the digits are to be presented. Digit Rules do not affect the collection of digits. Digit collection is an option which is specified by the application 11 when the call is connected. An application 11 may select one of the following Digit Rules: Single, Count, Delimiter and None. In a manner to be described, the AIM command provides the Digit Rule to be utilized, the Digit Count to control the number of digits returned, a Delimiter List to indicate which digits should be used to indicate the end of a string of digits, a Break List to specify which digits are to break or discontinue talk and listen voice operations, and a Time Limit which specifies the number of seconds the NAP 10 should wait after a command is executed for a digit to be entered. The Time Limit is an inter-digit time limit. Therefore, the NAP 10 will wait for digits to be entered after a command is executed as long as the time between digits is less than the Time Limit. The AIM command also provides a Digit Overrun field for reasons to be explained.

A Digit Rule of Single specifies that only a single digit is returned to the application 11 if the digit occurs before or while the command is being executed. A Digit Rule of Count specifies that the number of digits indicated by the Digit Count should be returned to the application 11. If the Digit Count is not satisfied by the time the command has been executed and the time between digits is greater than the Time Limit, the AIM response will be returned to the application 11 with Time Out set. A Digit Rule of Delimiter provides that the number of digits to be returned to the application 11 shall be the number of digits received up to the Digit Count until a digit specified in the Delimiter List is received. Again, Time Out will be returned if the condition is not satisfied. A Digit Rule of None specifies that no digits shall be returned to the application 11. The received digits are buffered in the digit buffer 35 until they are returned to the application 11 in an AIM response or are purged from the buffer 35 by a Purge Digits indicator in an AIM command.

The digit buffer 35 and the Digit Rules provide DTMF digit processing that permit an application 11 to perform digit collection, voice "barge in" and menu traversal type-ahead. Thus, digit processing permits a fixed number of, or a delimited variable number of, DTMF digits to be collected. The application 11 may designate a specific DTMF digit or list of DTMF digits to be interpreted as a delimiter which terminates collection. The digit processing permits DTMF digits to be entered in anticipation of prompts and the application may specify that detection of certain DTMF digits should interrupt prompts and/or terminate recording. With respect to digit collection, a predetermined number of digits are gathered and presented as a unit. For example, the application 11 can request the collection of a specified number of digits for the entry of a telephone number or telephone extension. When a call is connected or initiated, the application 11 can specify whether a DTMF receiver is required. If a DTMF receiver is requested, digit detection is continuous and does not end until the call is terminated or reconnected. If an AIM command does not process digits, any digits which are entered are held in the digit buffer 35. Buffered digits are processed when the application 11 sends a command which processes digits.

Referring to FIGS. 7a-7d the formats of the AIM Command and Response Messages are illustrated. Each message comprises a header in which common information is provided and a message body specific to the Message Type. FIG. 7a illustrates the header format for the AIM Command and AIM Response message. In addition, the Response header contains the information illustrated in FIG. 7b. FIGS. 7c and 7d illustrate the AIM Command and Response Message format, respectively.

Referring to FIG. 7a, a header 40 common to the AIM Command and Response Messages is illustrated. A Message Type field 41 specifies which command is to be executed by the NAP 10 when the header 40 is a command header and which response is being returned by the NAP 10 to the application 11 when the header 40 is a response header. Command Message Types are generated by the application 11 and Response Message Types are set by the NAP 10. A Dialog ID field 42 contains a string of characters which is utilized to identify a dialog. A Digit Rule field 43 specifies how digits are to be reported to the application 11. If the field 43 contains an S, C, D, or N the Digit Rule is Single, Count, Delimiter, or None, respectively. A Digit Count field 44 specifies the number of digits that are to be accumulated before they are delivered to the application 11. The field 44 is only utilized if the Digit Rule is Count or Delimiter. A Delimiter List field 45 specifies which digits should be used to indicate the end of a string of digits. When a digit is encountered which is in the Delimiter List, the digits collected by the NAP 10 will be sent to the application 11 in the response. The field 45 is only utilized if the Digit Rule is Delimiter.

A Break List field 46 specifies which digits are to discontinue talk and listen voice operations. If a digit is received which is contained in the Break List and there is a voice operation in process, the operation will be discontinued. If a digit in the digit buffer is also in the Break List when a command is submitted which processes digits, it will not be executed. For example, if a Send Voice Message is submitted and a digit in the Break List is in the digit buffer, the message(s) will not be sent; however, the Digit Rule will still be applied. The Break List is independent of the Digit Rule. Digits will be reported based on the Digit Rule that is in effect. Thus, the application 11 may specify that a given digit is to be a delimiter, but not break a voice operation. A Purge Digits field 47, if set, specifies that all the digits contained in the digit buffer 35 should be purged prior to the execution of the command. For the Digit Rules of count and Delimiter only, a Time Limit field 48 specifies the number of seconds that the NAP 10 should wait after a command is executed for a digit to be entered. After a command is executed, a timer (not shown) is started using the Time Limit specified. If the Time Limit is exceeded before or after a digit is entered, the Time Out flag is set in the AIM response. If a digit is entered before the Time Limit is exceeded and the entered digit does not satisfy the digit rule (i.e., count or delimiter), the timer is restarted for entry of another digit.

A Digit Overrun field 49 in the header 40 indicates that all digits in the buffer 35 in addition to those specified by the Digit Rule and Digit Count are to be returned in a response. Digit Overrun will only be used if the Digit Rule is satisfied. That is, if a Digit Rule of Count with Digit Overrun is specified and there are less than Digit Count digits in the buffer after the command is executed and more than Time Limit seconds have elapsed after the command was executed or the last digit received, Digit Overrun will be ignored.

If Digit Overrun is specified with a Digit Rule of Single, all digits in the digit buffer are returned in the response. If Digit Overrun is specified with a Digit Rule of Count and the number of digits specified in the Digit Count are present in the digit buffer 35, the AIM 15 will return all digits present in the digit buffer 35. If Digit Overrun is specified with a Digit Rule of Delimiter and a digit in the Delimiter List or the number of digits specified in the Digit Count are present in the digit buffer, the AIM will return all digits present in the digit buffer. If Digit Overrun is specified with a Digit Rule of None, it will be ignored. Thus, Digit Overrun allows an application to obtain a specified minimum digit collection, but all digits in the digit buffer 35 can be obtained.

Referring to FIG. 7b, a common AIM response header 50 is illustrated An On-Hook field 51 is set if a call is nor associated with the current dialog or if the NAP 10 detects that the caller has terminated the call by, for example, hanging up the telephone. A Time Out field 52 is set if a Time Out occurred while waiting for the Digit Rule to be satisfied. A Digits Received field 53 contains a count of the number of digits that are being reported. A Digit Delimiter field 54 contains the delimiting digit if the Digit Rule is Delimiter and a digit was received which is in the Delimiter List. A Digits field 55 contains the actual digits that were received.

Referring to FIG. 7c, an AIM command 60 is illustrated comprising the header 40 with the Message Type field 41 set with the appropriate command type, a message body 61 containing information specific to the Message Type, and a State area 62 which is provided for application use. Referring to FIG. 7d, an AIM response 65 is illustrated containing the headers 40 and 50 with the Message Type field 41 set with the appropriate response type, a body 66 containing information specific to the response type, and a State area 62 which is returned to the application.

The State field 62 is present in a command and response. The format, usage and length of this field is defined by the application 11. The application can change the State area 62 before each command if desired. The AIM 15 guarantees that the next response for this dialog will contain the State area that was provided in the previous command. Usage of the State area is optional, but is provided to allow an application an area for storage of information between commands. For example, an application could place information in a portion of the State area before a command is sent to the AIM 15 to indicate what function should be performed when the response is returned. The State area 62 allows applications to be written without the need to maintain tables indexed by Dialog ID to maintain call flow information. Instead, the application developer places information that would typically be maintained in tables in the application in the State area 62. Then as each response is received, information in the State area can be accessed to establish current location in the call flow and other call related information.

The following table provides a list of the AIM Command Set 30, which commands are expected from an application in a dialog. Commands are sent from an application 11 to the NAP 10 when the application wants the NAP 10 to perform a function. Within each dialog there is a one to one relationship between commands and responses; i.e., for each command sent by the application 11, the NAP 10 will return a response and for each response returned by the NAP 10, the application will issue a command.

| AIM COMMANDS | | |
|---|---|---|
| Message Type | Command | Valid Responses |
| 2 | Send Voice Message | 102,103,105 |
| 3 | Delete Voice Message | 104 |
| 4 | Connect Call | 101 |
| 5 | Terminate Dialog | None |
| 6 | Collect Digits | 110 |
| 8 | Repeat Poll | 204 |
| 9 | Initiate Call | 101 |
| 11 | Terminate Call | 110 |
| 12 | Get Message Numbers | 110 |
| 13 | Get Voice Message | 110 |
| 14 | Create Voice Message | 111 |
| 16 | Pivot Call | 101 |
| 17 | Split Call | 101,201 |

The following table provides a list of the solicited responses of the AIM Response Set 33. A solicited response is returned to the application 11 after a command has been executed.

| AIM SOLICITED RESPONSES | | |
|---|---|---|
| Response Type | Response | Valid Subsequent Commands |
| 101 | Call Connected | All Except 8,9 |
| 102 | Message Sent | All Except 8,9 |
| 103 | Message Received | All Except 8,9 |
| 104 | Message Deleted | All Except 8 |
| 105 | Voice Discontinued | All Except 8,9 |
| 110 | Command Executed | All Except 8 |
| 111 | Message Created | All Except 8 |

The following table sets forth the unsolicited responses in the AIM Response Set 33. An unsolicited response is generated by the NAP 10 in response to an incoming call or upon request by the application 11.

| AIM UNSOLICITED RESPONSES | | |
|---|---|---|
| Response Type | Response | Valid Subsequent Commands |
| 201 | Incoming Call | 4,5,11 |
| 204 | Poll Application | 8 |
| 205 | Application Request | 3,5,9,12,13,14 |

Specifics of the AIM commands will now be described.

The Send Voice Message command instructs the NAP 10 to send one or more voice messages over the established voice channel. The Send Voice Message command includes a variation permitting a Receive Voice Message operation to be initiated after sending the voice message or messages. Utilizing the variation, the voice channel must talk before it can listen. A small amount of silence is sufficient to satisfy this requirement. If Receive Voice Message is requested, a message is received and placed in the voice file. It is appreciated that Send Voice Message with the Receive Voice Message operation selected is an integrated command, not two commands that are joined. Therefore, receipt of a digit which is in the Break List will cause termination of the command. The command will terminate either before or after initiation of the Receive Voice Message operation. The Receive Voice Message variant of the command is activated by setting a Receive Voice Message field in the body 61 (FIG. 7c) of the command. In a manner to be described below with respect to the VMMM 16, the body 61 of the Send Voice Message command also includes a field defining the Message Numbers of the voice messages to be processed and a further field containing a count of the number of messages to be sent.

The Delete Voice Message command instructs the NAP 10 to delete a voice message. The body 61 of the command contains the Message Number of the voice message to be deleted. The voice message is deleted from the voice message data base in the disk system 23 (FIG. 1) to be later described.

The Connect Call message instructs the NAP 10 to disconnect and release the current outgoing port, if any, in the call associated with the dialog and connect the incoming port of the call to another outgoing port of the NIU 19 (FIG. 1). If the application 11 receives an Incoming Call unsolicited response, it must submit a Connect Call, Terminate Call or Terminate Dialog command. If a Connect Call command is executed without error, the NAP 10 will generate a Call Connected response. The Connect Call command implies answer supervision is to be provided. If the Connect Call command is submitted after a call is connected, the current outgoing port will be disconnected and a new outgoing port will be connected. After the call is connected to the new port, a Call Connected response is generated. The body 61 (FIG. 7c) of the Connect Call command contains fields for designating the outgoing port to be utilized for the call and for controlling the bridging of DTMF receivers onto the incoming and/or outgoing ports or permitting digits to be received therefrom. The outgoing port may be designated as a Tone Plant (not shown) with a field in the command body controlling the type of Tone Plant to be utilized. Tones such as ringback and busy can be applied to the port. The outgoing port can also be selected to connect the NIU 19 (FIG. 1) to a particular VIM 25 (FIG. 1).

The Terminate Dialog command controls the NAP 10 such that the dialog represented by the Dialog ID is terminated. If the dialog being terminated is currently processing a call, the call and the dialog will both be terminated. A dialog will remain active even if a caller has terminated a call. The application 11 must submit a Terminate Dialog command to terminate the dialog. No response is returned for this command.

The Collect Digits command is issued by the application 11 to extract digits buffered in the NAP 10 from the digit buffer 35 (FIG. 2). The NAP 10 returns a Command Executed response along with the digits requested. It is appreciated that digits are returned on most responses. This command is special only in that it allows applications to obtain digits without requesting any new NAP operation.

With respect to the Repeat Poll command, the AIM 15 establishes one dialog per application as the poll dialog which is used to poll the application. The primary purpose in polling the application is to allow the application to specify that another dialog is to be initiated. The Repeat Poll command requests that the AIM 15 send the application a Poll Application response after the number of seconds specified in the Time Limit have elapsed. A field in the Repeat Poll command can be used to indicate that a new dialog should be initiated. If this field is set, information contained in the Repeat Poll command is passed to the new dialog. An application would typically request initiation of another dialog for originating calls, starting a message deletion utility, archiving voice messages or restoring archived voice messages.

The Initiate Call command is utilized by the application 11 to control the NAP 10 to initiate a call. The body 61 of the command contains fields for selecting the incoming and outgoing ports for the call and for controlling the connection of DTMF receivers to the selected ports in a manner similar to that discussed above with respect to the Connect Call command. Tone Plant and VIM connections can also be effected by the Initiate Call command in a manner similar to that described above with respect to the Connect Call command. The body 61 of the Initiate Call command also contains a field for designating an initial Greeting Message identified by a Message Number in the field. If a Greeting Message is designated, the message is sent to the selected outgoing port as soon as the call is established and answer supervision has been provided. The Greeting Message field is only utilized when the incoming port i a VIM.

The Terminate Call command is sent to the NAP 10 when the application 11 desires to terminate, reject, or relinquish control of a call but retain the dialog. The body 61 of the command contains fields to control disconnecting the call, connecting a designated Tone Plant to the incoming port, or sending designated Announcements to the incoming port. A Digital Voice Message Unit (not shown) is included for containing the Announcements. Such a unit is preferably incorporated in the NIU 19.

The Get Message Numbers command is utilized when an application 11 desires to synchronize its data base with the data base maintained in the NAP 10. The primary purpose of data base synchronization is to permit the application 11 to delete orphan voice messages from the NAP 10. An orphan is a voice message which is present in the NAP 10, but not known in the data base of the application 11 responsible for that voice message. Further details of orphan voice message deletion will be provided hereinbelow with respect to the description of the VMMM 16 (FIG. 1). This command controls the NAP 10 to provide all of the Message Numbers in the NAP data base that are associated with the application 11 that were created prior to the most recent initialization of the NAP. In this manner the application 11 can compare its message data base with that of the NAP 10 and can delete messages in the NAP data base that are not in the application data base.

The Get Voice Message command controls the NAP 10 to place the voice data for the Message Number designated in the command body in a disk file designated in the command body. The disk file is contained in the disk system 23 (FIG. 1). This command is sent to the NAP 10 by the application 11 when, for example, the application desires to copy a voice message entered by a caller through the VIM 25 (FIG. 1) into a file. The copied message data is then accessible to the application, using the disk file designated, from the disk system 23 utilizing standard disk file mechanisms (i.e., separate from NAP). Thus Get Voice Message takes a voice message from the voice file and copies it to a file specified by the application 11, allowing an application to use the voice data as it desires. The Get Voice Message command places a voice message in a file external to the VMMM.

The Create Voice Message command informs the NAP 10 that a voice message is to be copied from a designated file and placed in the data base maintained by the NAP 10. The body 61 of the command includes a field identifying the file in which the created voice message is stored. The Create Voice Message command is principally utilized for installing prompts and announcements in the NAP data base so that they may be designated by applications 11 utilizing Message Numbers within other AIM commands. The Create Voice Message command takes a voice message stored in an external file and places it in the VMMM file.

Examples of uses of Get Voice Message and Create Voice Message include an archive and restore facility. Get Voice Message could be used to create archive files of messages. Create Voice Message could be used to restore them to the voice file.

The Pivot Call command changes the outgoing port of the dialog's call to the incoming port of the same call and establishes a new outgoing port. The original incoming port is disconnected. The body of the command contains fields selecting the new outgoing port, controlling the bridging of DTMF receivers to the new incoming and outgoing ports, controlling utilization of Tone Plants and controlling application of a Greeting Message to the ports in the manner described above with respect to the Connect Call and Initiate Call commands.

The Split Call command changes the outgoing port of the dialog's call to the incoming port of a new call, connects the incoming port of the dialog's call to a new outgoing port, and connects the original outgoing port of the dialog's call to a new outgoing port in the new call. If a Split Call command is executed without error, the NAP 10 generates a Call Connected response for the dialog's call and an Incoming Call response, with a new Dialog ID, for the new call that is established. The body of the command contains fields that select the new incoming and outgoing ports, control the connection of DTMF receivers to the ports, control the utilization of Tone Plants and control the application of a Greeting Message to the ports in a manner similar to that described above with respect to the Connect Call and Initiate Call commands.

The AIM responses are sent from the NAP 10 to the application 11 after a command has been executed or in response to an incoming call or upon request of an application 11. There are two types of responses, solicited and unsolicited. A solicited response is returned to an application 11 after a command has been executed. Unsolicited responses are sent to an application 11 without a command being executed. Within a dialog, there is a one to one relationship between commands and solicited responses. With the exception of the Message Type, the data items which are provided in the header of a command are reflected in the header of the next response for the same dialog. Details of the specific AIM responses will now be described.

The Call Connected response is generated after a Connect Call, Pivot Call, Split Call or Initiate Call command has been executed without error. Therefore, the call has been established and answer supervision provided. The body 66 (FIG. 7d) of the response includes fields providing port information of the type described above with respect to the Connect Call command.

The Message Sent response is generated when a voice message has been completely sent without being discontinued by the receipt of a digit contained in the Break List or an on-hook indication.

The Message Received response is generated after the NAP 10 has executed a Send Voice Message command with Receive Voice Message set and no errors were encountered. The receipt of this response indicates that a voice message has been stored in the data base in the disk system 23 (FIG. 1). The body 66 (FIG. 7d) of the response contains the Message Number assigned by the NAP 10 which is utilized to identify the voice message.

The Message Deleted response is generated by the NAP 10 after a Delete Message command has been executed without error.

The Voice Discontinued response is generated when a Send Voice Message command was not initiated or was discontinued because of a digit in the Break List or because of an on-hook indication. The Voice Discontinued response is generated when a Send Voice Message with a Receive Voice operation was discontinued by the receipt of a digit in the Break List or an on-hook indication before any voice data could be received.

The Command Executed response is generated by the NAP 10 when a command is executed without error Command Executed is used for commands when no specific response has been indicated.

The Message Created response is generated by the NAP 10 when a voice message has been created with the Create Voice Message command. The body 66 of the response includes a field containing the Message Number that represents the stored voice message.

The Incoming Call response is generated when a new call has been detected, but before answer supervision has been provided. The application 11 must respond with a Connect Call, Terminate Call or Terminate Dialog command. The body 66 of the response includes a Call Type field that indicates the type of call associated with the incoming call. The Call Type information is utilized to determine the appropriate application to utilize in a manner to be described. The body 66 of the response also contains fields providing port related information of the type described above with respect to the Connect Call command. The body 66 of the response further includes a field that indicates if the response is being generated as the result of a Split Call command and a field containing the original Dialog ID of the original call if a Split Call command engendered the response.

The Poll Application response is sent to the Poll Dialog of an application 11 when the Time Limit specified in the last Repeat Poll command for the application elapses. The application 11 is expected to respond to a Poll Application response with a Repeat Poll or Terminate Dialog command. The Application Request response is generated by the AIM 15 when it receives a Repeat Poll command which indicates that a new dialog should be initiated. The information contained in the Repeat Poll command is copied into the Application Request response and returned to the application. The application can use this new dialog as desired; for example, to initiate a call.

AIM commands 3, 4, 8, 9, 11-14, 16 and 17 do not process digits. Therefore, all fields in the message header which relate to digit processing are ignored. Any digits that are received will be placed in the digit buffer 35 (FIG. 2). It is appreciated from the foregoing, that AIM commands 2, 3, 12, 13 and 14 comprise the VMMM commands 31 (FIG. 2) that result in commands to the VMMM 16 (FIG. 1) and that AIM commands 4, 5, 9, 11, 16 and 17 comprise the NIUM commands 32 (FIG. 2) which result in commands to the NIUM 17 (FIG. 1).

Figure 3:
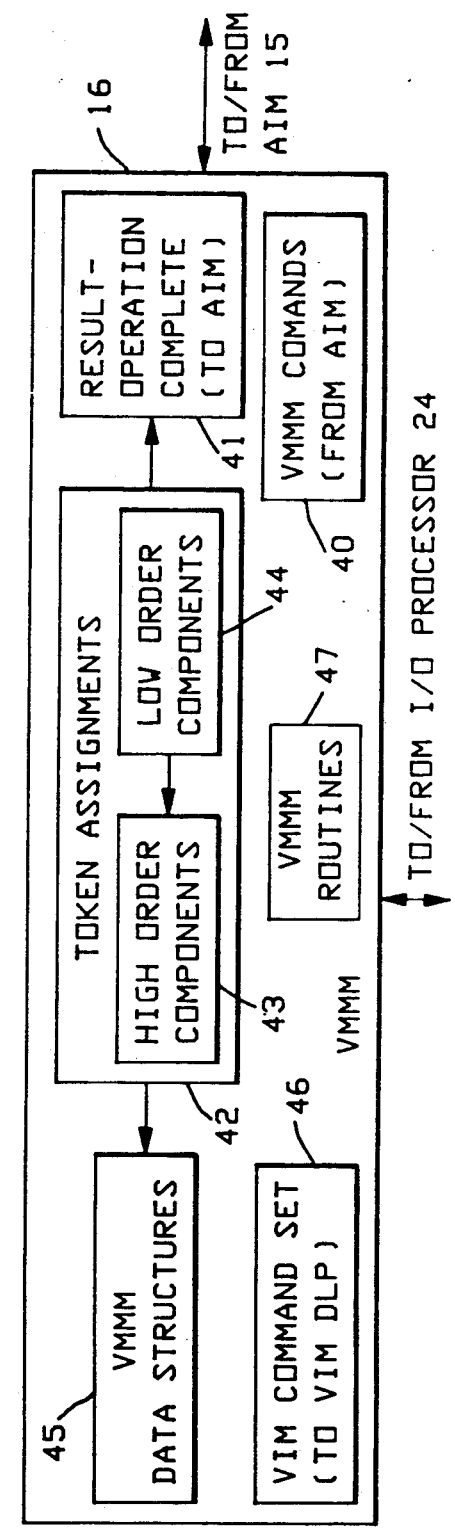
FIG. 3 is a schematic block diagram illustrating details of the Voice Message Management Module (VMMM) of the NAP of FIG. 1.

Referring to FIG. 3, in which like reference numerals indicate like components with respect to FIG. 1 and with continued reference to FIG. 1, further details of the VMMM 16 are illustrated. The VMMM 16 controls receiving digital voice messages from the VIM 25 at the direction of the applications 11 and storing the messages on the disk system 23, retrieving digital voice messages from the disk system 23 at the direction of the applications 11 and writing the voice messages to the VIM 25, and maintaining a data base of the voice messages. The digital voice data can include prompts and announcements as well as dynamically recorded user messages. When receiving digital voice messages from the telephone network 12, the VMMM 16 assigns a unique Message Number token to the received data and returns the Message Number to the application 11. When sending digital voice data to the telephone network 12, the application 11 specifies the appropriate Message Number to the NAP 10 and the NAP 10 uses the Message Number to locate the appropriate digital voice data on the disk system 23. The Message Number token created by the VMMM 16 when the VMMM 16 receives a voice message is unique over the expected lifetime of the system.

The VMMM 16 receives VMMM commands from the AIM 15 as schematically indicated by reference numeral 140. The VMMM commands 140 comprise: Send Voice Message, Delete Voice Message, Get Voice Message, Get Message Numbers and Create Voice Message. The Send Voice Message command includes a Receive Message option.

The only result returned by the VMMM 16 to the AIM 15 is an Operation Complete message as schematically indicated by reference numeral 141. A block 142 schematically represents the generation and assignments of the Message Number tokens by the VMMM 16. Each token is comprised of a high order component 143 and a low order component 144 in a manner and for reasons to be described hereinbelow.

The VMMM 16 is driven by the VMMM commands 140 issued by the applications 11 through the AIM 15. For every command accepted by the VMMM 16, a result message is returned by the VMMM 16. The VMMM 16 performs operations at the exclusive direction of the AIM 15 and returns result notifications only to the AIM 15. The VMMM commands 40 permit asynchronous operation of the application 11, the AIM 15 and the VMMM 16. Thus, the application 11 is not required to wait while the command is being processed.

Each command contains a field designating the Command Type. If the Command Type is Send Message, the command contains a field specifying if a Receive Message operation is to be executed after the voice message or messages are sent. If the Command Type is Send Message, fields of the command contain the Message Numbers of the voice messages to be processed. If the Command Type is Send Message and a Receive Message operation is specified, a field of the Response (Operation Complete) contains the Message Number that is assigned to the received voice message by the token assignment function 142 of the VMMM 16. If a Delete Message command is specified in the Command Type, the command includes a field containing the Message Number of the voice message to be deleted.

Each VMMM command 140 further includes fields containing the Voice Channel Number to which the current call is connected and the Call ID, respectively. The Call ID is a unique number identifying the current call and is established by the NIUM 17 when the NIUM receives an incoming call or the application 11 initiates a new call. The Call ID is thereafter maintained until the call is terminated by, for example, the user hanging up the telephone.

The Send Message command instructs the VMMM 16 to extract one or more designated voice messages from the voice data base on the disk system 23 and to send the voice messages to the designated voice channel. A variant of Send Message permits the Receive Message operation to be initiated after sending the voice message or messages. Thus, the voice channel must talk (possibly small silence) before it can listen. When the command is completed, an Operation Complete result message is sent to the application 11.

As described above, the Send Message command includes fields designating the Channel Number, Call ID and Message Numbers of the messages to be sent. The command also includes a field designating if the Receive Message operation is specified. If the Receive Message bit is set, the VMMM 16 provides a Message Number to be utilized to identify the voice message received. The Message Number is placed in a designated field in the Message Received response.

When an application 11 instructs the AIM 15 to receive a voice message, the application can request that the voice message be received uncompressed (8000 bytes of voice data per second) or compressed (4000 bytes of data per second). The compression rate is passed from the application 11 to the AIM 15. The AIM 15 passes the compression rate to the VMMM 16 which instructs the VIM to receive the voice message using the compression rate specified by the application 11.

The Delete Message command instructs the VMMM 16 to delete a designated voice message from the data base stored on the disk system 23. When the command is completed, an Operation Complete result message is sent to the AIM 15. The Delete Message command may or may not be associated with a voice channel. When the command is not associated with a voice channel, the Call ID is not utilized. The command includes a field to indicate the Message Number of the voice message to be deleted.

The Create Message command permits the VMMM 16 to insert a voice message into the voice data base stored on the disk 23. A field in the command designates the name of the file which contains the voice data which is to be copied into the voice data base. A field contained in the response (Operation Complete) designates the Message Number associated with the created message.

The Get Message command permits the VMMM 16 to build a file which contains voice data from the voice data base stored in the disk 23. A field in the command designates the name of the file which should be built from the voice data in the voice data base. Another field in the command designates the Message Number of the voice message to be copied to the designated file. When the command is completed, an Operation Complete result message is sent to the AIM 15.

The VMMM commands 140 also includes a Get Message Numbers command that returns all Message Numbers of stored voice messages in the voice data base on the disk system 23 that are associated with a designated application number created prior to the most recent initialization of system. The primary purpose of this command is to permit the application 11 to delete orphan voice messages from the VMMM data base. An orphan is a voice message which is present in the VMMM data base, but not known in the data base of the application 11. The application 11 can also delete those Message Numbers from its data base about which the VMMM 16 does not know. After the Message Numbers are returned to the application 11, it is the responsibility of the application 11 to delete such Message Numbers and to command the VMMM 16 to perform this operation.

The VMMM result message 141 is the Operation Complete message. The result message includes fields that repeat information contained in respective fields of the associated VMMM command. The result message repeats the Command Type, Voice Channel Number and Call ID. The result message also contains a field having a fixed character therein denoting that the Result Type is the VMMM Operation Complete result message. If the command that engendered the result message is Send Message, the result includes fields containing the designated Message Numbers in the command. If the command associated with the result is Send Message with Receive Message active, the Operation Complete result includes a field containing the Message Number assigned by the VMMM 16 utilized to identify the received voice message.

The structures of the voice message data base are schematically represented by a block 145. The VMMM voice data base structures 145 are constructed by the VMMM 16 in the main memory 18 and stored out on the disk system 23 (FIG. 1). The VMMM data base structures 145 will be described below with respect to FIGS. 8a–8d.

The VMMM 16 also schematically includes a VIM command set 146 which provides the commands to the VIM 25 (FIG. 1) for sending and receiving voice messages to and from the network 12 through the NIU 19. The VIM command set 146 will be discussed in detail below with respect to FIGS. 6 and 7e.

The VMMM 16 operates in accordance with routines schematically depicted as VMMM routines 47. The VMMM 16 is discussed in detail in co-pending U.S. patent application Ser. No. 514,783; filed Apr. 25, 1990; entitled "Apparatus and Method for Providing Recoverability in Mass Storage Data Base Systems without Audit Trail Mechanisms" by F. C. Kruesi and D. W. Heileman, Jr. and assigned to the assignee of the present invention. Said Ser. No. 514,783 is incorporated herein by reference in its entirety. For convenience, however, the following descriptions are provided.

Figure 8A:
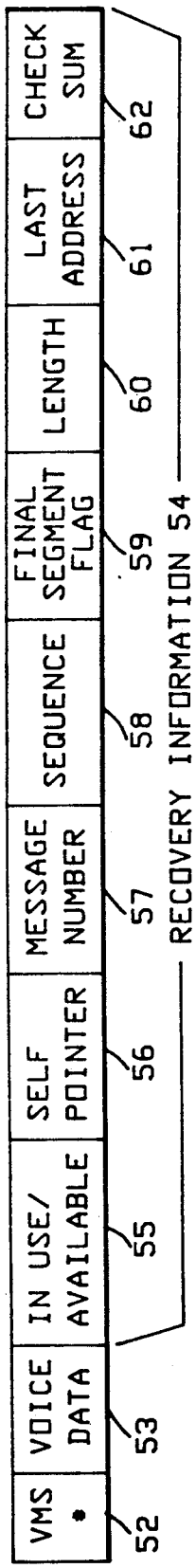
FIG. 8a is a diagram illustrating the format of the Voice Message Segments (VMS) stored via the VMMM in the disk voice file.
Figure 8B:
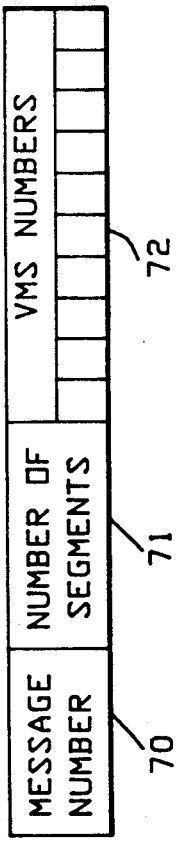
FIG. 8b is a diagram of the format of an index structure pointer to a voice message in the disk voice file.
Figure 8D:
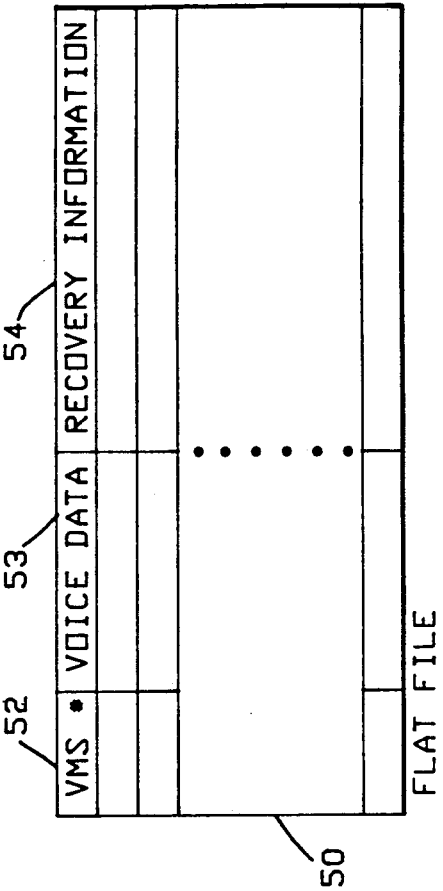
FIG. 8d is a diagram illustrating the layout of the disk voice file (flat file).
Figure 8C:
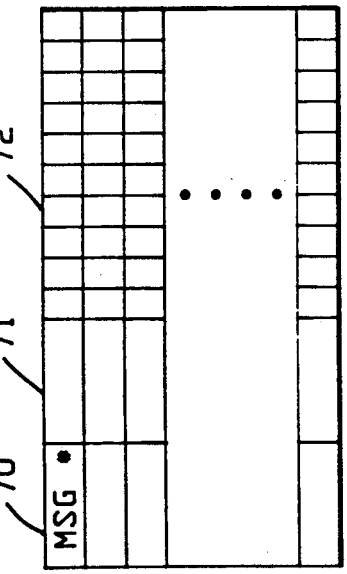
FIG. 8c is a diagram illustrating the layout of the voice file/index structure.

Referring to FIGS. 8a–8d, the VMMM data structures 145 are illustrated. Each voice message stored on the disk system 23 (FIG. 1) is assigned a Message Number or token by the VMMM 16 that is unique over the expected lifetime of the system. A voice message is identified by the unique token for purposes of storage and retrieval and is comprised of a number of Voice Message Segments (VMS), each VMS having an identifying address number. A continuous voice message is retrieved and played by consecutively retrieving the VMSs of which the voice message is comprised and contiguously playing the segments. The VMSs are stored in a voice message file 150 illustrated in FIG. 8d which is also referred to as the flat file. The flat file 150 is accessed by VMS pointers stored in a data base index structure 151 as illustrated in FIG. 8c. Details of each flat file record are illustrated in FIG. 8a and details of each data base index structure record are illustrated in FIG. 8b.

Referring to FIG. 8a, the format of each VMS stored in the flat file 150 is illustrated. The VMS is stored at a flat file address schematically represented by a VMS number 152 (not part of file). The VMS record is comprised of a field 153 for storing the digital voice data of which the VMS is comprised and fields 154 containing Recovery Information. The voice data in the field 153 is the data received from the voice channel or created using the Create Voice Message procedure. The Recovery Information in the fields 154 is utilized to recover the data base 151 in the event it is lost. The Recovery Information 154 is also utilized to test the integrity of retrieved voice messages.

The Recovery Information includes an Available Marker field 155 indicating if the VMS is in use as part of a voice message or if the VMS is available for use. The Recovery Information 154 includes a Self Pointer field 156 that contains the flat file pointer for this VMS. Thus, the Self Pointer field 156 contains the VMS number schematically indicated at 152. A Message Number field 157 contains the Message Number of the voice message to which the VMS belongs. A Sequence Field 158 contains the sequence number of the VMS in the sequence of VMSs that comprise the voice message. The sequence number in the field 158 is utilized to order the voice message segments for a given Message Number. The Recovery Information 154 includes a Final Segment Flag field 159 which contains a Final Segment Flag if the VMS is the final segment of a voice message. The Recovery Information 154 further includes a Length field 160 that contains the number of valid bytes in the voice message segment and also includes a Last Address field 161 containing a flat file pointer to the last segment of the voice message. The field 161 will contain the VMS number 152 of the final segment of the voice message. A Checksum field 62 contains a checksum of recovery information fields 153 through 161.

Referring to FIG. 8b, the format of the data base index structure pointer record is illustrated. A Message Number field 70 contains the Message Number of the voice message. The Message Number or token is assigned by the VMMM 16 when a voice message is received or created. A Number of Segments field 71 contains a count of the number of voice message segments in the voice message. Fields 72 contain the VMS numbers of the voice message segments comprising the voice message. The VMS numbers 72 are pointers to the flat file 150 whereat the desired VMSs can be retrieved.

A voice message is retrieved from the flat file 150 by accessing the associated Message Number 70 in the data base 151. The number of segments comprising the message is contained in the field 71 and the flat file pointers to the voice message segments are contained in fields 72. The sequence of VMSs comprising the message may be ordered utilizing the sequence numbers in the fields 158 of the VMSs so that a continuous and coherent voice message may be played out to the network.

As the data is read from the data base index structure 151 and the flat file 150, numerous integrity tests are effected. The checksum of fields 153 through 161 of each VMS is taken and compared with the Checksum stored in the field 162. The Self Pointer stored in the field 56 is compared for equality with the VMS number 152 for each VMS of the voice message. The field 55 is also tested to determine if the VMS is actually in use. The Message Number stored in the field 157 is compared with the message number in the field 70 to determine that each VMS actually belongs to the voice message.

If the index structure 151 of FIG. 8c is lost, the Recovery Information 154 in the flat file can be utilized to reconstruct the index structure. All of the information required for this purpose is contained in the Recovery Information 154. When the integrity tests detect a mismatch between the flat file 50 and the data base 151, the data base 51 is rebuilt from the flat file 150.

As previously described with respect to FIG. 3, the block 142 schematically represents the assignments of the Message Number tokens to the voice messages. Every voice message is assigned a token that is unique over the expected lifetime of the system. Voice messages are stored to and retrieved from the disk system 23 (FIG. 1) by the applications 11 utilizing the assigned tokens. The tokens are stored in the Message Number field 70 of the index structure pointers (FIG. 8b) as well as in the Message Number field 157 of each VMS (FIG.

8a). Each token is comprised of a high order component 143 and a low order component 144.

Referring to FIG. 9, a procedure for implementing the token assignments block 142 (FIG. 3) is illustrated. FIG. 9 illustrates the manner in which the Tokens or Message Numbers are created and managed. A Message Number is used to access Messages and is created when a Message is received. The Message Number is returned to the application. A Message Number is unique over the expected lifetime of the system and is generated from a master Message Number (not shown) consisting of a high-order component and a low-order component. Each time the apparatus is initialized, the high-order component is incremented by one and the low-order component is set to one. The low-order component is incremented by one as each Message is created. If the low-order component is incremented past its maximum value, the high-order component is incremented by one and the low-order component set to one. The high-order component is stored in a reserved location in the flat file 150 and written to a TNAUDIT file (not shown). When the apparatus increments the high-order component due to low-order component overflow, it does not use the incremented value until that value has been successfully recorded in both the flat file and the TNAUDIT file.

The Message Number uniqueness is significant with respect to data base integrity and recovery. The procedure of FIG. 9 minimizes run-time overhead and recovery time. With the procedure of FIG. 9, a disk write for token storage is required only after a million or so tokens have been issued, rather than after the issuance of each token.

Further details of the VMMM 16, the VMMM routines 147 and the construction of the data base index structure and flat file are found in said Ser. No. 514,783.

Referring to FIG. 6, with continued reference to FIGS. 1 and 3, details of the VIMs 25 are illustrated. As described above, the VMMM 16 controls the operation of the VIMs 25 with respect to sending voice messages to the network 12 and receiving voice messages therefrom. These operations are controlled via the I/0 processor 24 and the voice channel command queues 26. As discussed with respect to FIG. 3, the VMMM 16 includes the VIM command set 146 for commanding the VIMs 25 to perform the required operations. The VIMs 25 provide the interface between the block-oriented, contention-based environment of the NAP 10 and the real-time, stream-oriented environment of the T1 trunk 21.

In order to effectively provide such an interface without having an extremely large buffer memory (gigabytes), the VIMs 25 perform the voice messaging operations in piecemeal fashion in a manner to be explained. In contrast, prior art data link processors completely perform and terminate each operation sequentially. Additionally, the NAP 10 is required to start listening to the network 12 immediately after talking thereto if so instructed by the VMMM 16. Details of the manner in which these functions are performed are described in co-pending U.S. patent application Ser. No. 503,195, filed Apr. 2, 1990, entitled "Apparatus For Interfacing A Real-Time Communication Link To An Asynchronous Digital Computer System", by R. A. Latimer and D. W. Heileman, Jr. Said Ser. No. 503,195 is assigned to the assignee of the present invention and incorporated herein in its entirety.

The VIM command set 146 (FIG. 3) comprises the following commands: SEND TALK DATA, GET LISTEN DATA, SET PHASE COUNT, and TERMINATE PHASE. The VMMM 16, via the I/0 processor 24, stacks sequences of SEND TALK DATA, GET LISTEN DATA and SET PHASE COUNT commands in the voice channel command queues 26 for sequential application to the VIMs 25. The TERMINATE command by-passes the queues 26 and is applied directly to the VIMs 25 via a bus 90 (FIG. 1). It is appreciated, that the bus 90 also transports voice data to and from the VIMs 25 as well as result signals from the VIM 25 to the VMMM 16.

With continued reference to FIG. 6, the VIM 25 receives the commands from the queues 26 as well as the directly applied TERMINATE command on the bus 90, as schematically represented by a VIM command block 91. As described in said Ser. No. 503,195, the VIM 25 includes buffers 92 for buffering talk voice data to be sent from the VMMM 16 via the bus 90 to the T1 trunk 21 and listen voice data received from the T1 trunk 21 to be sent to the VMMM 16 via the bus 90. The buffers 92 include a sequence of transmit buffers 93 for sending talk voice data to the trunk 21 and a sequence of receive buffers 94 for receiving listen voice data from the trunk 21. A suitable interface 95 is interposed between the T1 trunk 21 and the buffers 92. The buffers 92 and the interface 95 are controlled by a buffer manager 96 responsive to the VIM commands from the VIM command block 91. The buffer manager 96 also sends Result signals back to the VMMM 16 via the bus 90 to provide status information to the VMMM 16.

Referring to FIG. 7e, the format of the VIM command is illustrated. The command includes a field 100 to designate the operation to be performed by the command; viz, SEND TALK DATA, GET LISTEN DATA, SET PHASE COUNT and TERMINATE. A Last Flag field 101 includes a Last Flag when the command is the last in a sequence of commands defining a logical operation. The Last Flag field is only utilized with the SEND TALK DATA and GET LISTEN DATA commands. Each VIM command also includes a Channel Number field 102 for designating the applicable voice channel on the VIM. A Link field 103 contains information from the VMMM 16, so that the VIM 25 can make appropriate use of the memory to which the voice data is stored (disk system 23). Details of the use of the Link field 103 are described in said Ser. No. 503,195. A Phase field 104 is included in each VIM command for containing a Phase count that groups the VIM commands into logical sequences. All of the VIM commands in a logical sequence have the same Phase count. The last VIM command in a logical sequence has the Last Flag field 101 set. A Listen Field 105 provides an option utilized with the SEND TALK DATA command so that the buffer manager 96 can control the interface 95 and the buffers 92 for receiving Listen Data from the T1 trunk 21 immediately after sending the last of the Talk data associated with a sequence of SEND TALK DATA commands.

In response to SEND TALK DATA the buffer manager 96 controls the buffers 92 to fill the transmit buffers 93 with Talk Data to be transmitted to the T1 trunk 21. The Talk Data is received into the transmit buffers 93 via the bus 90. The buffer manager 96 controls the buffers 92 and the interface 95 to sequentially empty the transmit buffers 93 onto the T1 trunk 21, rotating the buffers such that the transmit buffers in turn become the current buffer. After a predetermined number of buffers have been emptied, the buffer manager 96 refills the emptied buffers from the bus 90 with further Talk Data of the voice message to be sent. As described in said Ser. No. 503,195, a buffering strategy is utilized by the buffer manager 96 to maintain the transmit buffers 93 as full as possible to absorb system latency and prevent buffer underrun.

If the Listen field 105 indicates that Listen Data is to be received after the last Talk Data has been sent, the buffer manager 96 controls the buffers 92 and the interface 95 so that the Listen Data is received into the receive buffers 94. In order to get the Listen Data, the VMMM 16 utilizes the GET LISTEN DATA commands which command the buffer manager 96 to control the receive buffers 94 to begin receiving the Listen Data. In accordance with the buffering strategy described in said Ser. No. 503,195, the Listen Data is placed in the current receive buffer. When the current buffer fills, buffer rotation is controlled and the next buffer becomes the current buffer. After a predetermined number of receive buffers are filled, the buffer manager 96 empties the filled buffers over the bus 90 to render the buffers empty and again available. The buffering strategy utilized is such as to maintain the receive buffers 94 as empty as possible to absorb system latency and to prevent receive buffer overflow.

In operation, the VMMM 16 places appropriate sequences of VIM commands into the voice channel command queues 26 to accomplish the voice message transmission and reception operations required by the applications 11 (FIG. 1). A logical sequence of VIM commands is designated by utilizing the same Phase Count in the field 104. When a logical sequence of operations is concluded by receipt of the VIM command with the Last Flag field 101 set, the Phase Count is incremented to the next higher Phase Count to begin controlling the next required sequence of operations. If the VMMM 16 desires to terminate a SEND TALK DATA or GET TALK DATA sequence, a TERMINATE command is issued with the Phase Count field 104 set to the Phase Count of the operation in progress. Since the TERMINATE command by-passes the voice channel command queues 26 and is applied directly from the I/O processor 24 to the VIM command block 91, the operation is immediately terminated. A termination operation may, for example, be utilized if a caller goes on-hook or enters a terminating DTMF digit. Such terminating conditions are detected by the AIM 15 through the NIU 19 and the NIUM 17. The AIM 15 then issues a VMMM command to the VMMM 16 which results in the VMMM 16 issuing the TERMINATE command to the VIM 25.

Thus, termination is processed by the AIM 15 and VMMM 16. The application 11 (via commands) specifies the termination conditions.

The SET PHASE COUNT command may be used to set the phase count to the value specified in the command for such purposes as VIM clearing or invalid voice channel operations. The buffer manager 96 returns Result signals to the VMMM 16 via the bus 90 and the I/O processor 24 to maintain the VMMM 16 informed of the status of the voice data message handling operations. The Result signals are utilized by the VMMM 16 to synchronize the buffering strategy operations described above and in said Ser. No. 503,195.

It is appreciated from the foregoing, that the Phase Count is utilized to form logical groups of SEND TALK DATA or GET LISTEN DATA commands into logical sequences for the purpose of continuous connection of voice data transmission across multiple SEND or GET operations. The end of a logical grouping sequence is denoted by setting the Last Flag field 101. A logical sequence of operations is discontinued by issuing the TERMINATE command with a matching Phase Count.

Figure 5:
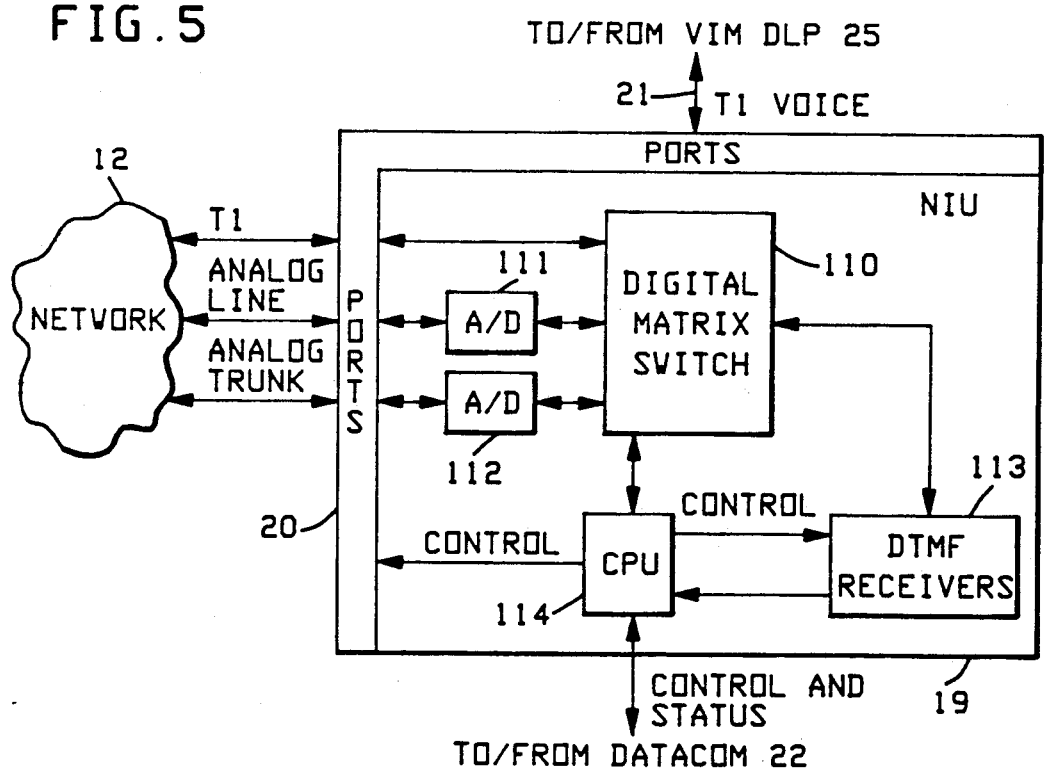
FIG. 5 is a schematic block diagram illustrating details of the Network Interface Unit (NIU) of the NAP of FIG. 1.

Referring to FIG. 5, details of the NIU 19 are illustrated. The NIU 19 provides an interface with the network 12 for the voice channels of the VIMs 25 via the T1 voice link 21 and with the VNMS 14 via the Datacom 22 to report status signals thereto and receive control signals therefrom. The NIU 19 includes a digital matrix switch 110 that interconnects with the ports 20 so that any port can be connected to any other port. Digital links of the network 12, such as T1 links, connect directly to the digital matrix switch 110 via the ports 20. Analog lines and trunks of the network 12 connect to the digital matrix switch 110 via the ports 20 and analog-to-digital converters 111 and 112. The NIU 19 further includes DTMF receivers 113 that can be controllably connected to any ports via the digital matrix switch 110. A CPU 114 is included in the NIU 19 for controlling the ports 20, the switch 110 and the DTMF receivers 113. The CPU 114 receives control signals from the NIUM 17 and reports status signals thereto via the Datacom 22. DTMF digits gathered from a port to which a DTMF receiver is connected are reported to the NIUM 17 via the CPU 114. The CPU 114 includes a data base for storing protocol data such as inpulsing and outpulsing rules for the ports 20 of the NIU 19.

Each voice channel of the network 12 connects to a port 20 of the NIU 19 and permits two parties to communicate with each other. When a call arrives at the NIU 19 from the network 12, signalling information, typically including the telephone number being called, is detected by a connected DTMF receiver 113 and reported to the NIUM 17. Additionally, signalling information such as on-hook and off-hook is also transmitted through the switch 110 to the NIUM 17.

It is appreciated, that some of the ports 20 connect to the lines and trunks of the telephone network 12 while other NIU ports are connected to the digital voice facilities of the NAP 10 via the T1 voice span 21 and the VIMs 25. A call typically consists of an incoming port and an outgoing port. When a network call is received by the NAP 10 and connected to a VIM 25 for digital voice storage, the network-side port is the incoming port and the VIM port is the outgoing port. When the NAP 10 initiates a network call to send stored digital voice data, the network-side port is the outgoing port and the VIM port is the incoming port.

Figure 4:
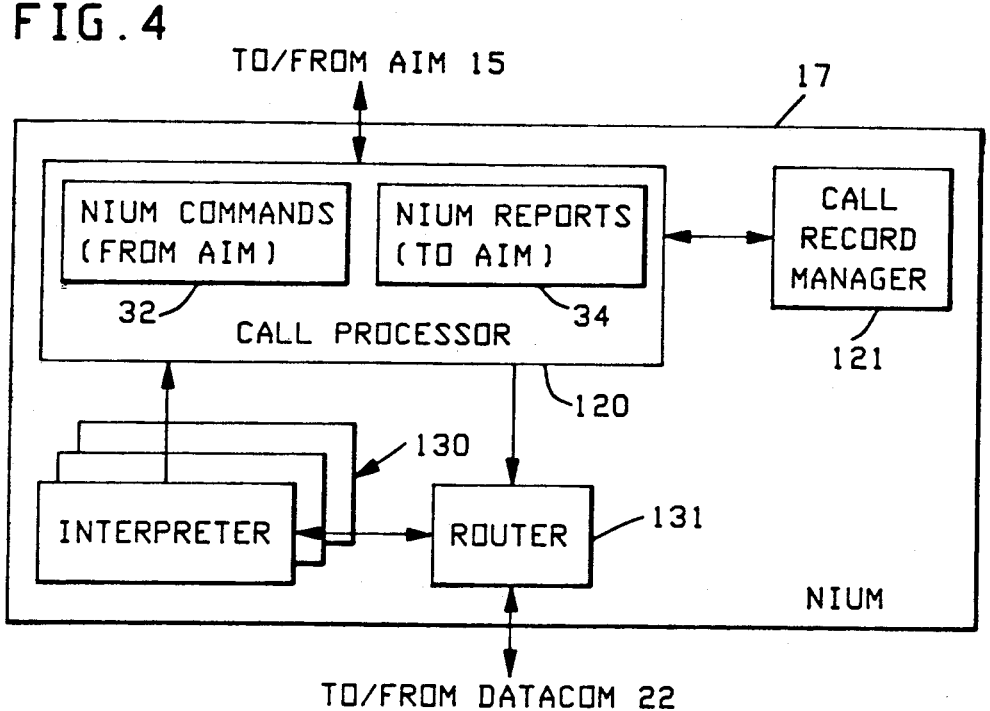
FIG. 4 is a schematic block diagram illustrating details of the Network Interface Unit Manager (NIUM) of the NAP of FIG. 1.

Referring to FIG. 4, with continued reference to FIGS. 1 and 5, details of the NIUM 17 are illustrated. The NIUM 17 includes a Call Processor 120 that provides all communication between the NIUM 17 and the AIM 15. The Call Processor 120 performs call state management, reports call activity to the AIM 15 and directs actions of the ports 20 of the NIUs 19 at the request of the AIM 15. All requests from the AIM 15 to the NIUM 17 and from the NIUM 17 to the AIM 15 are via the Call Processor 120. The NIUM 17 is responsive to the AIM commands discussed above for NIUM processing via the Call Processor 120 as schematically represented by the NIUM Commands block 32. As discussed above, these commands comprise CON- NECT CALL, INITIATE CALL, TERMINATE CALL, PIVOT CALL and SPLIT CALL. The Call Processor 120 also provides NIUM Reports to the AIM 15 as schematically indicated by the block 34. The NIUM Reports include information such as arrival of an incoming call, DTMF digits received from a call, and call status signals such as on-hook. A Call Record Manager 121 establishes a NIUM Call Record containing information required by the Call Processor 120 in making the NIUM Reports 34 back to the AIM 15.

Referring to FIG. 7f, the format of the NIUM Call Record is illustrated. A field 122 contains a Call ID uniquely identifying the call being processed. Fields 123 and 127 contain identifications of the incoming and outgoing ports of the call, respectively. The NIUM Call Record also includes a field 125 for containing an identification of the associated application 11 and a field 128 for providing call status information such as a calling or called party having gone on-hook.

The NIUM Call Record further includes fields 124 and 126 for holding the signalling digits received from the incoming port and sent to the outgoing port, respectively. Space is reserved within each call record for five digit strings of up to twenty digits each. These are referred to as Digit Fields 0 through 4.

Signalling digits received during call setup are stored in the incoming digit fields 124. The digit fields 124 are then permuted in an order determined by the call setup arrangement assigned for that call, processed in a manner determined by the incoming digit treatment assigned to the incoming port, and permuted again in an order determined by the receiving application.

For NAP-initiated calls, the digit fields are permuted in an order specific to the initiating application, processed in a manner determined by the outgoing digit treatment assigned to the outgoing port, stored in the outgoing digit fields 126, and may be permuted again by the NIU in an order determined by the application-supplied outpulse rule (after translation) or the default outpulse rule assigned to the outgoing port.

Thus it is appreciated, that the Call Record Manager 121 manages the NIUM Call Records. All of the State information for a particular telephone call is maintained in the NIUM Call Record internal data structure.

Referring again to FIG. 4, with continued reference to FIGS. 1, 5 and 7f, the NIUM 17 includes multiple Interpreters 130 with one Interpreter for each NIU of a given type. Thus, the architecture of the NAP 10 permits each type of NIU to be managed by a separate Interpreter 130, thereby supporting heterogeneous NIU configurations. All NIU-specific algorithms are localized in the Interpreter modules 130. The Interpreter modules 130 perform management of the NIUs 19.

The NIUM 17 further includes a Router module 131 to provide message routing for the NIUM 17. Incoming traffic from the NIU links from Datacom 22 (FIG. 1) is routed to appropriate (based on NIU type) Interpreters 130 and the Interpreters in turn report relevant port activity to the Call Processor 120. Requests by the Call Processor 120 to perform specific port actions are also routed to appropriate Interpreters 130 and the Interpreters in turn dispatch appropriate outgoing messages to the NIU links via the Router 131 and Datacom 22. Thus, the Router 131 routes the Datacom traffic on the NIU links to and from the Interpreters 130. All requests to the Interpreter modules 130 from the Call Processor 120 are directed to the Router 131 and distributed to the appropriate Interpreter module 130 by the Router 131.

Thus, the Router 131 contains the necessary logic to route messages pertaining to particular NIUs to particular Interpreter modules based on the type of NIU.

The primary task of the NIUM 17 is call processing. To accomplish this task the NIUM 17 manages signalling, digit treatment, interpreter translations and NIU/port control. A call consists of an incoming port and an optional outgoing port. An incoming port is the terminating end of a leg of a call and it receives forward signalling. An outgoing port is the originating end of a leg of a call and it transmits forward signalling. A port is a single selectable telephone facility supported by the NAP 10. A port may comprise a tone generator, a network circuit, or a DTMF receiver. Between initializations of the NAP 10, a call is uniquely identified by a Call ID.

When a network call arrives at the NAP 10, the associated NIU 19 sends a message via a control link of the Datacom 22 indicating the incoming port activity and signalling digits. The signalling information, such as the DTMF digits comprising the called number, arrives or is sent on the same trunk that contains the associated voice channel or the signalling is sent out of band on another facility. Thus the NIU 19 receives the signalling information and reports it to the NIUM 17 via the NIU control link of the Datacom 22.

The Router 131 receives the message and invokes the appropriate Interpreter 130. A Call ID is generated and a Call Record is allocated by the Call Record Manager 121. The signalling digits are placed in the Call Record in appropriate fields 124 and 126. Utilizing translation tables (not shown), the incoming port and treated signalling digits are utilized to define a call type and the appropriate application 11 (FIG. 1) for the call. An Application ID is accordingly generated by the translation tables and placed in the field 125 of the Call Record. The Call Processor 120 sends an NIUM Report to the AIM 15 indicating the arrival of a call, the Call ID, the call type, the digit fields, information regarding the ports utilized and the Application ID. The AIM 15 in turn performs configurable application-specific translation of the digit fields and port addresses and sends an Incoming Call message to the application which was selected according to the call type.

When an application 11 sends a CONNECT CALL command to the AIM 15, the AIM 15 performs configurable application-specific translation of the outgoing port addresses, digit fields, tone specifications, and outpulsing rules and invokes the Call Processor 120 passing a message indicating the Call ID, outgoing port, digit fields, DTMF receiver options, optional tone specifications, and outpulsing rule. The Call Processor 120 imports a Call Record from the Call Record Manager 121 based on the Call ID. The Call Processor 120 invokes an Interpreter 130 via the Router 131 passing the Call Record thereto. The invoked Interpreter 130 formats a message to establish the connection between the designated incoming and outgoing ports of the NIU 19 according to the translated outpulse rule, invokes the Router 131 to dispatch the message over the appropriate NIU control link of the Datacom 22 and then updates the Call Record to indicate that a Connect operation is in progress.

When an NIU 19 completes a connection request, the NIU sends a message to the NIUM 17 via the associated control link of the Datacom 22. The Router 131 receives the message and invokes the appropriate Interpreter 130 passing the message text. The Interpreter 130 imports the Call Record from the Call Record Manager 121 based on the incoming port designated in the received message. The Interpreter 130 determines from the state stored in the Call Record that a Connect operation is in progress. The Interpreter 130 then updates the Call Record to indicate that the Connect operation is complete and invokes the Call Processor 120 passing the Call Record. The Call Processor 120 invokes the AIM 15 passing a message indicating that the call has been connected and specifying the Call ID as well as the incoming and outgoing ports. The AIM 15, in turn, performs configurable application-specific translation of port addresses and sends a Call Connected Response message to the appropriate application 11.

As previously described, the NIUM commands by the AIM 15 are received from the Call Processor 120 as schematically indicated by block 32. The NIUM commands corresponding to the AIM commands are denoted as ConnectCall, TerminateCall, InitiateCall, PivotCall and SplitCall. It is appreciated with respect to the following descriptions of the NIUM commands that appropriate configurable application-specific translations are performed as explained above and described below.

With respect to ConnectCall, if the incoming port of the call is connected to an outgoing port, the connection is broken and the outgoing part is forced on-hook. A new outgoing port is selected in accordance with the outgoing port requested and the incoming port is connected to the outgoing port. If ringback was selected, the incoming port listens to ringback tone until answer supervision is detected on the outgoing port. When answer supervision is detected on the outgoing port if ringback was selected, a two-way voice path is cut between the ports. If a DTMF receiver was requested, a DTMF receiver is connected to the incoming port and enabled.

An application invokes the TerminateCall command by passing the Call Processor 120, via AIM 15, a message indicating the Call ID, a call disposition code, and optional tone or announcement parameters, depending on the disposition code. The disposition code selects one of four variations of call termination processing: Laissez Faire, Disconnect, Tone, or Announcement.

The Call Processor 120 imports a Call Record from the Call Record Manager 121 based on the Call ID. Configurable application-specific translations are performed on the tone an announcement parameters, if present./ The Call Processor 120 then stores the encoded parameters into the Call Record and invokes the appropriate Interpreter 130 via the Router 131, passing the Call Record. The Interpreter 130 processing of the TerminateCall command depends on the call disposition code.

If the Laissez Faire disposition code was selected, the Interpreter 130 marks the Call Record to indicate that no further events for the call are to be transmitted to the application. The call continues undisturbed in its current state until it spontaneously disconnects due to one or both of the parties going on-hook.

If the Disconnect disposition code was selected, the Interpreter 130 formats and passes to the NIU, via Router 131, messages to tear down the voice path between the incoming and the outgoing port, and to perform disconnect processing on the ports, including forcing the ports on-hook if the hardware type permits it.

If the Tone disposition code was selected, the Interpreter 130 formats and passes to the NIU, via Router 131, messages to remove the outgoing port of the call and force it into disconnect processing and to present the selected tone to the incoming port. The tone is presented to the incoming port for a reasonable time, following which the Interpreter 130 formats and passes, via Router 131, a message to perform disconnect processing on the incoming port. The intent is to provide standard progress tones, such as Reorder, to calls for which further service cannot be provided.

If the Announcement disposition code was selected, the Interpreter 130 formats and passes to the NIU, via Router 131, messages to remove the outgoing port of the call and force it into disconnect processing and to present the selected announcements to the incoming port. At the conclusion of the announcements, the NIU passes a message, via Router 131, to the Interpreter 130, which then commands the incoming standard announcements to calls for which service cannot be provided.

In no case is there any response to the application concerning the TerminateCall command, or further dialog concerning the call upon which the command acts.

When an application sends an InitiateCall command to AIM 15, AIM 15 invokes the Call Processor 120, passing a message indicating the Call ID, selected incoming and outgoing ports, digit fields, DTMF receiver options, ringback tone options, and outpulsing rule. The Call Processor 120 requests a new Call Record from the Call Record Manager 121, and associates this Call Record with the Call ID. The Call Processor 120 then performs configurable application-specific translations of the parameters for the InitateCall command and stores the encoded outcomes in the Call Record. The Call Processor 120 invokes the selected Interpreter 130, via Router 131, passing the Call Record.

The interpreter 130 formats and passes to the NIU, via Router 131, a message which causes a forced call origination at the selected incoming port. The Interpreter 130 updates the Call Record state to indicate that the call is suspended awaiting the call origination, and returns the Call Record to the Call Record Manager 121.

When the NIU completes the forced origination, it passes a response message to the Interpreter 130 via Router 131. The Interpreter 130 imports the Call Record from the Call Record Manager 121, based on the selected incoming port. The Interpreter 130 notes from the Call Record state and response that the condition which caused the suspension has been satisfied, examines the encoded parameters in the Call Record, and formats and passes a message to the NIU to establish a connection between the incoming and selected outgoing ports in accordance to the selected outpulsing rule. The Call Record is suspended once again.

When the connection process has been started, the NIU returns a response and the Interpreter 130 again examines the encoded parameters in the Call Record. If a ringback tone has been requested, a command message to cause the NIU to present the selected tone to the incoming port, pending answer on the outgoing port, is formatted and sent. The Call Record is marked to indicate that an answer condition is the next event expected for the call. If no ringback tone was selected, the Call Record is simply marked as waiting for answer and suspended.

If the outgoing port answers within a time limit, the NIU sends a message to that effect to the Interpreter 130. The Interpreter 130 examines the encoded parameters in the Call Record and determines whether a DTMF receiver was requested; if so, a command is passed to the NIU to attach a receiver and begin collection. A message indicating that the call has been connected is passed from the Interpreter 130 to the Call Processor 120. Application-specific translations of the selected ports are performed, and the response is forwarded to the application via AIM 15. If no DTMF receiver was requested, the application response is formatted and processed in an identical fashion.

If the outgoing port fails to answer within the time limit, a response message indicating that the call attempt failed (on-hook) is transmitted to the application via the Call Processor 120 and AIM 15.

When an application sends a PivotCall command to AIM 15, AIM 15 invokes the Call Processor 120, passing a message indicating the Call ID, selected outgoing port, digit fields, DTMF receiver options, ringback tone options, and outpulsing rule. The Call Processor 120 imports the Call Record from the Call Record Manager 121, depending upon the Call ID. The Call record must represent a call having an outgoing port, or an error is returned, via AIM 15, to the application. The Call Processor 120 then performs configurable application-specific translations of the parameters for the PivotCall command and stores the encoded outcomes in the Call Record. The Call Processor 120 invokes the selected Interpreter 130, via Router 131, passing the Call Record.

The Interpreter 130 formats and passes to the NIU, via Router 131, a message which breaks the connection between the incoming and outgoing ports; the incoming port being forced into disconnect processing. The Interpreter 130 updates the Call Record to indicate that the former outgoing port of the call is now to be used as the incoming port of the call, and then suspends the call.

When the NIU completes the disconnection process, it passes a response message to the Interpreter 130 via Router 131. The Interpreter 130 imports the Call Record from the Call Record Manager 121, based on the new incoming port. The Interpreter 130 notes from the Call Record state and the response that the condition which caused the suspension has been satisfied, examines the encoded parameters in the Call Record, and formats and passes a message to the NIU to establish a connection between the new incoming and selected outgoing ports in accordance to the selected outpulsing rule. The Call Record is suspended once again.

When the connection process has been started, the NIU returns a response and the Interpreter 130 again examines the encoded parameters in the Call Record. If a ringback tone has been requested, a command message to cause the NIU to present the selected tone to the incoming port pending answer on the outgoing port is formatted and sent. The Call Record is marked to indicate that an answer condition is the next event expected for the call. If no ringback tone was selected, the Call Record is simply marked as waiting for answer and suspended.

If the outgoing port answers within a time limit, the NIU sends a message to that effect to the Interpreter 130. The interpreter 130 examines the encoded parameters in the Call Record and determines whether a DTMF receiver was requested; if so, a command is passed to the NIU to attach a receiver and begin collection. A message indicating that the call has been connected is passed from the Interpreter 130 to the Call Processor 120. Application-specific translations of the selected ports are performed, and the response is forwarded to the application via AIM 15. If no DTMF receiver was requested, the application response is formatted and processed in an identical fashion.

If the outgoing port fails to answer within the time limit, a response message indicating that the call attempt failed (on-hook) is transmitted to the application via the Call Processor 120 and AIM 15.

When an application sends a SplitCall command to AIM 15, AIM 15 invokes the Call Processor 120, passing a message indicating the Call ID, selected outgoing ports, digit fields, DTMF receiver options, ringback tone options, and outpulsing rules for two calls. The Call Processor 120 imports the Call Record from the Call Record Manager 121, depending upon the Call ID. The Call Record must represent a call having an outgoing port, or an error is returned, via AIM 15, to the application. The Call Processor 120 then performs configurable application-specific translations of the parameters for the SplitCall command and stores the encoded outcomes in the Call Record. The Call Processor 120 invokes the selected Interpreter 130, via Router 131, passing the Call Record.

The Interpreter 130 formats and passes to the NIU, via Router 131, a message which breaks the connection between the incoming and outgoing ports. The Interpreter 130 requests a new Call Record from the Call Record Manager 121 and updates the new Call Record to indicate that the former outgoing port of the call is now to be used as the incoming port of the new call. The encoded parameters for the new call are moved from the old Call Record into the new, and both calls are suspended.

When the NIU completes the disconnection process, it passes a response message to the Interpreter 130 via Router 131. The Interpreter 130 imports the Call Records from the Call Record Manager 121, based on the new incoming ports. The Interpreter 130 notes from the Call Record states and the response that the condition which caused the suspension has been satisfied, examines the encoded parameters in the Call Records, and formats and passes a message to the NIU to establish a connection between the incoming and selected outgoing ports, in accordance to the selected outpulsing rule, in both the old and the new calls. Connection processing now proceeds independently for both the old and the new call as for the ConnectCall or PivotCall commands.

Notification of a successful connection processing for the old call is by way of a Call Connected AIM 15 response. Notification of successful connection processing for the new call is by way of an AIM 15 Incoming Call response, with the Call ID of the old call noted in a field of the Incoming Call response reserved for this purpose. Failed connection processing in the old call is noted via the AIM 15 on-hook response. Failed connection processing in the new call is not reported to the application, but is noted as an exception in the NAP event log.

With respect to the Collect Digits AIM command, the NIUM report 34 to the AIM 15 contains the DTMF digits detected in the call. The NIUM 16 reports the digits and AIM 15 processes and reports them to the application 11. The NIUM Reports 34 also contain on-hook information if a port in the call went on-hook; incoming call information if a new call has arrived at the NAP 10; call connected information indicating that the connection requested by a previous ConnectCall, InitiateCall, PivotCall or SplitCall command has been established; information that all requested features have been applied; and information that answer supervision has been returned on the outgoing port.

It is appreciated from the forgoing, that because of the architecture of the NAP 10, the NAP relieves application developers from concern about the details of physical connection to the telephone network. The NAP 10 accomplishes this by introducing a level of abstraction between the applications 11 and the underlying network 12 including the connecting hardware. Signalling protocols, NIU type-specific message formats, component addresses, and component interconnection are managed entirely by the NAP 10 and are not visible to network applications. Additionally, the NAP 10 provides "application independence". The architecture of the NAP 10 permits each application 11 to be developed independently from other applications. Furthermore, the NAP architecture permits an application to be installed and operated without regard to any other applications installed at the same installation and without requiring reprogramming of the applications or the NAP.

These desiderata are accomplished by a translation-based architecture that applies configurable application-specific translations to all address-related fields in application commands and responses. In the absence of such a translation-based architecture, application developers would be required to coordinate or bind the application to a specific hardware configuration. The translation architecture localizes NIU type-specific algorithms in separate INTERP modules having regular interfaces, and applies configurable NIU specific translations of all NIU facility addresses. For example, tone values used by an application to represent dial tone, ringback, and reorder may be assigned arbitrarily by the application developer and need not be the same for all network applications at one NAP installation. As another example, one application may expect the called number in a particular digit field while another application at the same installation may expect the called number in another digit field. The NAP 10 supports both applications simultaneously. Additionally, both applications may use interchangeably some ports for which the associated signalling protocol places the called number in a particular digit field and other ports for which the associated signalling protocol places the called number in other digit fields. It is further appreciated that applications need not be in the same system.

Further details of the Translation Architecture will now be explained. The NIUM provides a set of algorithmic translations. These translations can be classified as presentation, utility, or attribution translations. The intent of presentation translations is to support the abstraction of applications from their physical environment. The intent of utility translations is to provide functionality which is either common to many applications, or which could not be provided within applications without tightly coupling them to the network state. The intent of attribution translations is to provide default settings for NIU and Call Processor parameters. Presentation translations include: Call Setup, Call Type, Digit Field Treatment, and Application Configuration translations. Utility translations include Outgoing Call Routing translations. Attribution translations include: Port Group Attribute and Membership, VIM Configuration, and NIU Configuration translations.

The intent of the Call Setup translation is to present a new call to the call processor in a standard format, regardless of the type of signalling used to establish the call. The type of signalling which established the call is referred to as the Call Setup Arrangement.

Two classes of call setup arrangements are supported. Call setup by way of in band signalling is accomplished by an inpulse rule. An inpulse rule is a macro processed by the SDS-1000 NIU which controls the low level detail of in band signalling. The call setup arrangement assigned to a call setup by in band signalling corresponds directly to the inpulse rule used. Call setups by Simplified Message Desk Interface (SMDI) common channel signalling are accomplished by an SMDI translation within the Call Setup Translations. The call setup arrangement assigned to a call setup by SMDI signalling corresponds to a code within the SMDI signalling packet which indicates the reason for the call: all calls forwarded, forwarded/busy, forwarded/no answer, or called directly.

Calls setup by different arrangements will contain variable amounts and types of signalling information. An SMDI call with the forwarded/busy call setup arrangement, where the calling party is serviced by the same central office as the called party, will contain both the called and calling numbers. An SMDI call with the called directly call setup arrangement, where the calling party is outside the central office serving the SMDI group, will contain no signalling information other than the call setup arrangement.

Variations in signalling content are accommodated by the digit field treatment translation (see below). Variations in signalling order are accommodated by Digit Field Permutation translations. The system administrator can define a NAP digit field format consisting of five digit fields numbered 0 to 4 of up to twenty digits each; assigning any significance desired to any field. A digit field permutation associated with each call setup arrangement is provided to transform the incoming signalling into the administrator defined sequence.

The Call Type translation consolidates setup and signalling information with data tables in such a way as to produce a token, called a Call Type, which represents a class of calls of which the call is a member. An example of this process might be that all calls with SMDI call setup arrangements of "forwarded/busy" are to be assigned the call type "Answer/Busy". All calls of a given type are processed by an application selected by the application call setup mapping (see Application Configuration translations below).

The translation consists of a hierarchical network of tables. The highest level of tables corresponds to specific port addresses, and allows selection of a default call type for a port. The next level of tables corresponds to NAP port group identifiers (see Port Group Attribute and Membership translation below), and allows selection of a default call type from a port group. These two levels are used to configure "hot lines", that is, ports or groups of ports from which all incoming calls are routed to a particular application regardless of signalling information.

The next level of tables corresponds to the call setup arrangement of the call, and allows selection of a default call type for a particular port or group of ports, depending on the call setup arrangements used in the current instance of a call at a port.

Next are two groups of three levels of tables, the first corresponding to the signalling information stored in NAP digit field 0, the second corresponding to signalling information stored in NAP digit field 1. The three levels of tables correspond to subfields of the related NAP digit field, as defined by the North American numbering plan: NPA—the first three digits of the field as expanded to ten digits by adding leading zeros (if necessary), NXX—the second three digits of the (expanded) field, and XXXX—the final four digits of the (expanded) field. The three levels of tables correspond, respectively, to the NPA subfield, the NXX subfield, and the XXXX subfield of the corresponding NAP digit field.

The translation proceeds from the highest to the lowest table levels within each group, searching for a match at each level. If a match is found, the table entry may specify a NAP call type identifier, a table at the next lower level, or the "error" token. Each table level must contain an "else" entry, and if no match is found, this entry is used.

If the selected entry contains a NAP call type identifier, then the call is assigned the specified type and the translation terminates. If the selected table entry specifies a table at the next lower level, then processing proceeds with that table and the datum corresponding to the table level. If the selected table entry contains the "error" token, the call setup is aborted, and an error event is logged.

When processing the lowest level of tables, corresponding to the XXXX field of NAP digit field 1, table entries must contain a NAP call type identifier or the "error" token.

Digit Field Treatment translation involves Permutation and Digit Treatment. Every port has an associated call setup arrangement which determines how the signalling digits received during call setup must be permuted to arrange them in a standard order. Call setup arrangements and their associated digit field permutations are specified by the system administrator.

Digit Treatment allows the system administrator to specify the treatment of network signalling digits so that the applications 11 may deal with consistently formatted telephone numbers and are not required to cater to the nuances of network signalling formats and protocols. For each port, for each digit field, and for both incoming and outgoing signalling cases, the system administrator may specify any combination of the following actions to be performed on each digit string: leading digits can be deleted from the digit string; a pattern-dependent transformation of leading digits can be specified; and up to six digits can be prefixed to the digit string.

Application Configuration Translations involve Application Permutation, Call Type Selection, Port Number, Tone Number, and Announcement Number Translations for providing desirable effects of the Translation Architecture described herein.

The Outgoing Call Routing translation allows an application to direct the call processor to select an outgoing facility based on the number to be called, or any other application specified token expressed as a string of digits and placed in a digit field.

The translation consists of a hierarchical network of tables. Each level of tables corresponds to a subfield of the digit string passed by the application (see Call Type Translation above). The highest table level corresponds to the NPA subfield. The intermediate table level corresponds to the NXX subfield. The lowest level corresponds to the XXXX subfield.

The translation proceeds from the highest to the lowest table levels, searching for a match at each level. If a match is found, the table entry may specify a port address, a table at the next lower level, or the "error" token. Each table level must contain an "else" token, and if no match is found, this entry is used. If the selected table entry specifies a port address, then that port is used as the outgoing leg of the call. If the selected table entry specifies a table at the next lower level, then processing proceeds with that table and the next subfield of the application specified token. If the selected table entry contains the "error" token, processing is aborted and an error is passed to the application via the AIM 15.

When processing at the lowest level of tables, corresponding to the XXXX subfield of the application specified token, table entries will contain a port address or the "error" token.

The Port Group Attribute and Membership translation allows the Call Processor to determine default attributes for any port. The available attributes are: Call Setup Arrangement, Digit Treatment, Call Type, Outpulse Rule, Subscriber Line, and Attendant Line.

The VIM Configuration translation specifies the connectivity of VIM voice channels and NIU ports. The translation allows the Call Processor to determine when a voice channel is a member of a call, and to inform VMMM via AIM of the voice channel's physical address within the A Series I/O subsystem.

The NIU Configuration translations include: NIU type, NIU control link connectivity, NIU tones, NIU phrases and NIU outpulse rule translations.

The NIU type translation allows Router to select the appropriate Interpreter for an NIU. The NIU control link connectivity translation informs Router of the data communication links available to each NIU.

The NIU tone, phrase, and outpulse rule translations allow the Call Processor to map the NAP identifiers (see Application Configuration Translations above) for these tokens to/from the corresponding NIU identifier.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. A telephone network application platform for interfacing between a telephone network and at least one telephone application program, said platform comprising:

digital computer means programmed to be operative to perform telephone network functionality in response to commands issued by said telephone application program, said telephone network functionality residing in said computer means independent of said telephone application program and actuatable in response to said commands, said commands including a SEND VOICE MESSAGE command and a RECEIVE VOICE MESSAGE command, said telephone network functionality including sending a voice message to said network and receiving a voice message from said network in response to said SEND VOICE MESSAGE command and said RECEIVE VOICE MESSAGE command, respectively, application interface means coupled between said telephone application program and said computer means and responsive to said commands from said telephone application program for actuating said telephone network functionality in response to and in accordance with said commands, said application interface means being responsive to said SEND VOICE MESSAGE command and said RECEIVE VOICE MESSAGE command from said telephone application program for activating said telephone network functionality by causing a voice message to be sent to said network and causing a voice message to be received from said network in response to said SEND VOICE MESSAGE command and said RECEIVE VOICE MESSAGE command, respectively, and network interface means coupled between said network and said computer means for conveying said voice messages therebetween.

2. The platform of claim 1 wherein said network interface means includes ports coupled to said network and ports coupled to said computer means, and controllable switching means coupled to said ports and to said computer means for interconnecting and, disconnecting said port in response to control signals from said computer means.

3. The platform of claim 2 wherein said application interface means includes means for providing Response signals to said telephone application program, said Response signals including an Incoming Call Response engendered by said platform receiving a telephone call from said network, said commands including an INITIATE CALL command and said telephone network functionality further including initiating a telephone call to said network in response to said INITIATE CALL command.

4. The platform of claim 3 wherein said commands include a CONNECT CALL command and said telephone network functionality includes switching said ports in response to said CONNECT CALL command.

5. The platform of claim 4 wherein said network interface means includes a plurality of network interface units and a plurality of respective interpreter means interposed between said application interface means and said network, said network interface units having differing characteristics with respect to each other, each said interpreter means being so constructed and arranged as to translate said differing characteristics of said network interface unit associated therewith into standard predetermined characteristics, thereby permitting said telephone application program to be written independent of said differing characteristics of said network interface units.

6. The platform of claim 5 wherein said telephone application program has application-specific characteristics specific thereto and said network interface means includes call processor means interposed between said application interface means and said network, said call processor means being operative to translate said application-specific characteristics into said standard predetermined characteristics, thereby permitting said telephone application program to be written independent of said standard predetermined characteristics.

7. The platform of claim 3 wherein said commands further include a TERMINATE CALL command, a PIVOT CALL command and a SPLIT CALL command, said telephone network functionality further including disconnecting a selected one of said ports in response to said TERMINATE CALL command, switching a call from one said port to another said port in response to said PIVOT CALL command, and splitting a telephone call into two separate calls in response to said SPLIT CALL command by switching each port of said telephone call to other respective ports.

8. The platform of claim 3 wherein said SEND VOICE MESSAGE command includes said RECEIVE VOICE MESSAGE command as an option and said telephone network functionality includes controlling said network interface means to receive a voice message from said network after sending a voice message thereto in response to said SEND VOICE MESSAGE command.

9. The platform of claim 8 further including data storage means coupled to said computer means for storing said voice messages, and voice interface means coupled between said network interface means and said computer means for conveying said voice messages from said storage means to said network interface means in response to said SEND VOICE MESSAGE command and for conveying voice messages received from said network interface means to said data storage means in response to said RECEIVE VOICE MESSAGE option.

10. The platform of claim 9 wherein said commands include a DELETE VOICE MESSAGE command, and said telephone network functionality includes deleting a designated voice message from said data storage means in response to said DELETE VOICE MESSAGE command.

11. The platform of claim 9 wherein said commands include a CREATE VOICE MESSAGE command, and said telephone network functionality includes creating a voice message for storage in said data storage means in response to said CREATE VOICE MESSAGE command by copying a message reading in a file of said telephone application program into said data storage means.

12. The platform of claim 9 wherein said telephone application program has voice messages associated therewith stored in said data storage means, each said voice message having an identification number associated therewith, said commands include a GET MESSAGE NUMBERS command, and said telephone network functionality includes sending said identification numbers to said telephone application program in response to said GET MESSAGE NUMBERS command.

13. The platform of claim 9 wherein said commands include a GET VOICE MESSAGE command, and said telephone network functionality includes getting a voice message from said data storage means into a file of said telephone application program in response to said GET VOICE MESSAGE command by copying a message residing in said data storage means into a file of said telephone application program.

14. The platform of claim 3 wherein
said network interface means includes digit receivers switchably connectable to said ports,
at least one said command includes a DIGIT RECEIVER option for connecting a digit receiver to a selected port, and
said telephone network functionality includes connecting a digit receiver to a selected port in response to said DIGIT RECEIVER option.

15. The platform of claim 14 wherein
said application interface means includes a digit buffer for storing digits received from said network,
said commands include a COLLECT DIGITS command, and
said telephone network functionality includes sending digits stored in said digit buffer to said telephone application program in response to said COLLECT DIGITS command.

16. The platform of claim 15 wherein
at least one said command includes a field for storing a Break List of digits provided by said telephone application program, and
said telephone network functionality includes terminating sending a voice message to said network or receiving a voice message from said network in response to receiving a digit in said Break List.

17. The platform of claim 15 wherein
at least one said command includes a field for storing a digit rule specified by said telephone application program to control how said digits are collected, and
said telephone network functionality includes controlling how said digits are collected in response to said digit rule.

18. The platform of claim 17 wherein
said digit rules include a digit rule of Count,
said command includes a field for storing a digit count provided by said telephone application program, and
said telephone network functionality includes collecting a predetermined number of digits from said network in accordance with said digit count and storing said collected predetermined number of digits in said digit buffer.

19. The platform of claim 17 wherein
said digit rules include a digit rule of Delimiter,
said command includes a field for storing a Delimiter List of digits provided by said telephone application program, and
said telephone network functionality includes collecting digits until a digit in said Delimiter List is encountered.

* * * * *